US012126222B2

(12) United States Patent
Purchase et al.

(10) Patent No.: US 12,126,222 B2
(45) Date of Patent: Oct. 22, 2024

(54) SEALED AXIAL FLUX MOTOR WITH INTEGRATED COOLING

(71) Applicant: Indigo Technologies, Inc., Woburn, MA (US)

(72) Inventors: Scott T. Purchase, Cambridge, MA (US); Peter Madden, Reading, MA (US); Rachel A. Dias Carlson, Albany, NY (US)

(73) Assignee: Indigo Technologies, Inc., Woburn, MA (US)

( * ) Notice: Subject to any disclaimer, the term of this patent is extended or adjusted under 35 U.S.C. 154(b) by 0 days.

(21) Appl. No.: 17/818,014

(22) Filed: Aug. 8, 2022

(65) Prior Publication Data

US 2023/0033646 A1 Feb. 2, 2023

Related U.S. Application Data

(63) Continuation of application No. 17/252,485, filed as application No. PCT/US2019/037438 on Jun. 17, 2019, now Pat. No. 11,411,450.
(Continued)

(51) Int. Cl.
*H02K 1/2796* (2022.01)
*H02K 1/2795* (2022.01)
(Continued)

(52) U.S. Cl.
CPC ......... *H02K 1/2795* (2022.01); *H02K 1/2796* (2022.01); *H02K 5/10* (2013.01);
(Continued)

(58) Field of Classification Search
CPC .... H02K 1/182; H02K 1/2793; H02K 1/2795; H02K 1/2796; H02K 5/10; H02K 5/225;
(Continued)

(56) References Cited

U.S. PATENT DOCUMENTS 3,608,661 A 9/1971 Arnot
8,307,931 B2 11/2012 Akamatsu
(Continued)

FOREIGN PATENT DOCUMENTS

CN 102396135 A 3/2012
CN 103155365 A 6/2013
(Continued)

OTHER PUBLICATIONS

Machine translation of CN104734425, Jun. 2015 (Year: 2015).*
(Continued)

*Primary Examiner* — Eric Johnson
(74) *Attorney, Agent, or Firm* — Smith Baluch LLP

(57) ABSTRACT

Conventional axial flux motors typically include multiple rotors and stators resulting in a larger and heavier motor. Additionally, conventional axial flux motors include a housing to protect the rotors and stators, but the housing is often difficult to seal from the environment leading to risks of contaminants (e.g., dirt, water) infiltrating the motor and causing failure over time. The present invention overcomes these limitations by disclosing an axial flux motor with a single rotor and two stators. The use of a single rotor reduces the size and weight of the motor. An inboard housing and an outboard housing mechanically support the two stators and are joined together to define an interior cavity. A ring seal is disposed between the two housings to ensure the interior cavity is sealed. Additionally, the two stators may actuate multiple degrees of freedom (DOF) including the rotation of a wheel and actuation of a suspension.

20 Claims, 22 Drawing Sheets

Related U.S. Application Data

(60) Provisional application No. 62/685,445, filed on Jun. 15, 2018.

(51) Int. Cl.
| | |
|---|---|
| *H02K 5/10* | (2006.01) |
| *H02K 5/132* | (2006.01) |
| *H02K 5/20* | (2006.01) |
| *H02K 5/22* | (2006.01) |
| *H02K 9/19* | (2006.01) |
| *H02K 9/22* | (2006.01) |
| *H02K 16/04* | (2006.01) |
| *H02K 21/24* | (2006.01) |
| *H02K 7/102* | (2006.01) |

(52) U.S. Cl.
CPC ............... *H02K 5/132* (2013.01); *H02K 5/20* (2013.01); *H02K 5/225* (2013.01); *H02K 9/19* (2013.01); *H02K 16/04* (2013.01); *H02K 21/24* (2013.01); *H02K 7/102* (2013.01); *H02K 9/227* (2021.01)

(58) Field of Classification Search
CPC .......... H02K 7/102; H02K 7/12; H02K 7/125; H02K 9/19; H02K 9/193; H02K 9/197; H02K 9/227; H02K 16/04; H02K 21/21; H02K 21/22; H02K 21/23; H02K 21/25; H02K 21/26; B60K 7/0007; B60K 2007/0007; B60K 2007/003; B60K 2007/0038

See application file for complete search history.

(56) References Cited

U.S. PATENT DOCUMENTS

| | | |
|---|---|---|
| 8,362,660 B2 | 1/2013 | Hunter |
| 8,519,575 B2 | 8/2013 | Hunter et al. |
| 8,585,062 B2 | 11/2013 | Hunter |
| 8,624,699 B2 | 1/2014 | Hunter et al. |
| 8,742,633 B2 | 6/2014 | Hunter et al. |
| 8,766,493 B2 | 7/2014 | Hunter et al. |
| 9,172,287 B2 | 10/2015 | Fofonoff et al. |
| 9,231,462 B2 | 1/2016 | Hunter et al. |
| 9,473,009 B2 | 10/2016 | Hunter et al. |
| 9,810,552 B2 | 11/2017 | Hunter et al. |
| 9,843,249 B2 | 12/2017 | Hunter et al. |
| 9,934,904 B2 | 4/2018 | Hunter et al. |
| 10,476,360 B2 | 11/2019 | Hunter et al. |
| 10,483,832 B2 | 11/2019 | Hunter et al. |
| 10,644,578 B2 | 5/2020 | Hunter et al. |
| 10,742,083 B2 | 8/2020 | Hunter et al. |
| 10,763,713 B2 | 9/2020 | Carlson et al. |
| 10,938,285 B2 | 3/2021 | Hunter et al. |
| 11,368,076 B2 | 6/2022 | Hunter et al. |
| 11,411,450 B2 * | 8/2022 | Purchase .............. B60K 7/0007 |
| 2003/0159866 A1 | 8/2003 | Claypole et al. |
| 2005/0285467 A1 | 12/2005 | Shimizu |
| 2009/0195106 A1 | 8/2009 | Iki et al. |
| 2010/0326748 A1 | 12/2010 | Sgherri et al. |
| 2010/0327674 A1 | 12/2010 | Marsh et al. |
| 2012/0006608 A1 * | 1/2012 | Suzuki ..................... F16H 1/32 180/65.51 |
| 2013/0009450 A1 | 1/2013 | Suzuki et al. |
| 2013/0069467 A1 | 3/2013 | Smith et al. |
| 2014/0265738 A1 | 9/2014 | Anderson et al. |
| 2015/0061440 A1 | 3/2015 | Catalan |
| 2015/0144410 A1 | 5/2015 | Fraser |
| 2016/0111987 A1 | 4/2016 | Hunter et al. |
| 2016/0380523 A1 | 12/2016 | Hunter et al. |
| 2017/0182879 A1 | 6/2017 | Girotto |
| 2018/0072120 A1 | 3/2018 | Hunter et al. |
| 2018/0076701 A1 | 3/2018 | Hunter et al. |
| 2018/0226188 A1 | 8/2018 | Hunter et al. |
| 2020/0198456 A1 | 6/2020 | Kawamura et al. |
| 2020/0307330 A1 * | 10/2020 | Girotto ................ B60K 7/0007 |
| 2021/0044165 A1 | 2/2021 | Carlson et al. |
| 2021/0218322 A1 * | 7/2021 | Mihaila ................ H02K 5/203 |
| 2021/0283970 A1 | 9/2021 | Moriarty et al. |

FOREIGN PATENT DOCUMENTS

| | | | | |
|---|---|---|---|---|
| CN | 104734425 A | * | 6/2015 | |
| CN | 106104989 A | | 11/2016 | |
| DE | 102009035176 A1 | | 2/2011 | |
| EP | 0697759 A1 | | 2/1996 | |
| EP | 1081386 A2 | | 3/2001 | |
| EP | 1612913 A2 | | 1/2006 | |
| EP | 1081386 B1 | | 3/2006 | |
| EP | 1932706 A2 | | 6/2008 | |
| EP | 2803865 A1 | | 11/2014 | |
| EP | 3023654 A1 | | 5/2016 | |
| JP | 2006240430 A | | 9/2006 | |
| JP | 2008001241 A | | 1/2008 | |
| JP | 2012034481 A | | 2/2012 | |
| JP | 2012184818 A | | 9/2012 | |
| JP | 2012249469 A | | 12/2012 | |
| JP | 2016059195 A | * | 4/2016 | ............... B60K 7/00 |
| KR | 20130033087 A | | 4/2013 | |
| WO | 2008003986 A1 | | 1/2008 | |
| WO | 2011115219 A1 | | 9/2011 | |
| WO | 2013112158 A1 | | 8/2013 | |
| WO | 2017123441 A1 | | 7/2017 | |
| WO | 2019241765 A1 | | 12/2019 | |
| WO | 2020117826 A1 | | 6/2020 | |

OTHER PUBLICATIONS

Ishikawa machine translation of JP2016059195, Apr. 2016 (Year: 2016).*
Partial Supplementary European Search Report in European Application No. 19820096.6 dated Jan. 31, 2022.
Extended European Search Report in European Application No. 19820096.6 dated May 30, 2022 19 pages.
First Office Action with translation in Chinese Appl. No. 201980049944.9 dated Aug. 31, 2023, 18 pages.
International Search Report and Written Opinion in International Patent Application No. PCT/US2019/037438 mailed Sep. 9, 2019, 11 pages.
Notification of Refusal w translation in Japanese Appl. No. 2020-569764 mailed Jul. 10, 2023, 15 pages.
Office Action with translation in Chinese Appl. No. 201980049944.9 dated Apr. 27, 2024, 14 pages.
Notice of Allowance with translation in Mexican App. No. MX/A/2020/013693 dated Feb. 27, 2024, 6 pages.
Office Action with translation in Korean App. No. 10-2021-7001238 dated Jan. 22, 2024, 16 pages.
Office Action (Decision to Grant) with translation in Chinese Appl. No. 201980049944.9 dated Jul. 15, 2024, 11 pages.

* cited by examiner

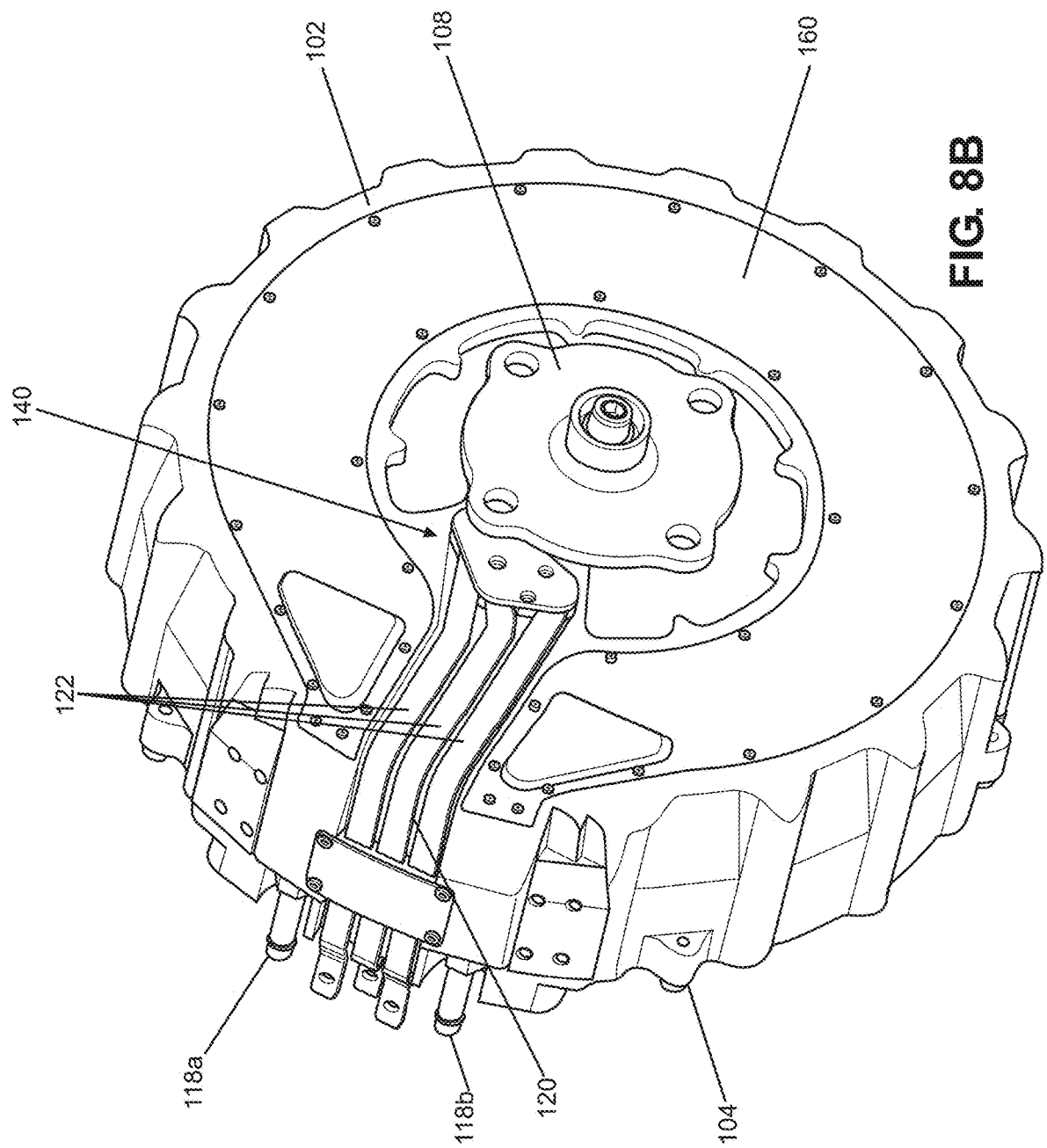

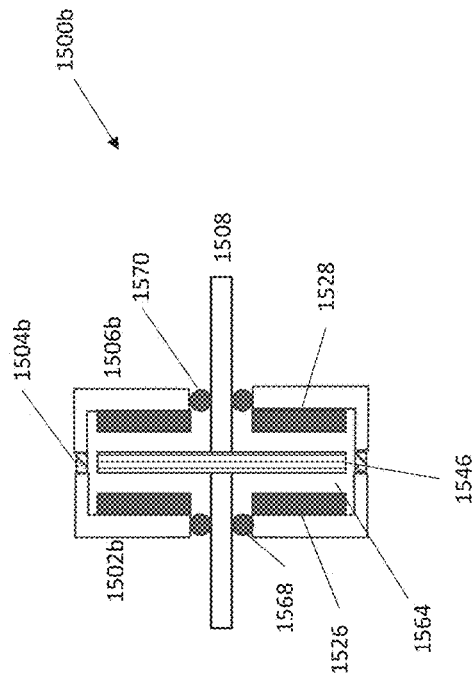
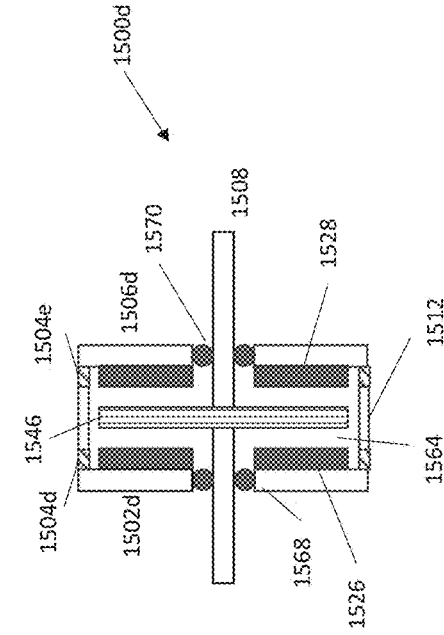
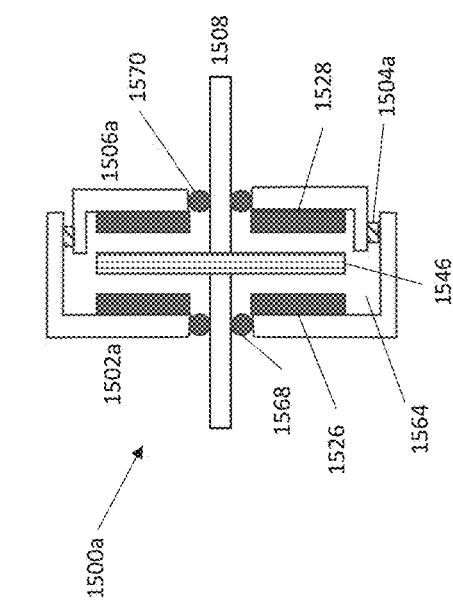
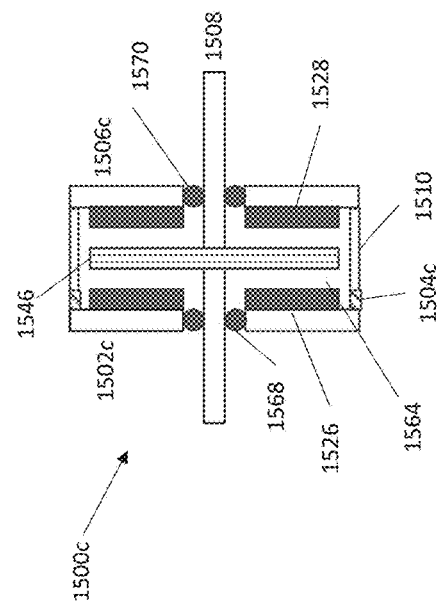

SEALED AXIAL FLUX MOTOR WITH INTEGRATED COOLING

CROSS-REFERENCE TO RELATED APPLICATION(S)

This application a continuation of U.S. application Ser. No. 17/252,485, filed Dec. 15, 2020, and entitled "A Seal Axial Flux Motor with Integrated Cooling," which is a U.S. national stage filing under 35 U.S.C. 371 of PCT/US2019/037438, filed Jun. 17, 2019, and entitled "A Sealed Axial Flux Motor with Integrated Cooling," which claims the priority benefit, under 35 U.S.C. 119(e), of U.S. Application No. 62/685,445, filed on Jun. 15, 2018 and entitled "Axial Flux Motor with Cooling System," each of which is incorporated herein by reference in its entirety.

BACKGROUND

Electric vehicles and hybrid vehicles conventionally use radial flux motors for propulsion. The radial flux motor typically includes (1) a rotor with multiple magnets positioned along the periphery of the rotor such that the magnetic flux lines generated by the magnets are oriented radially with respect to the rotation axis of the rotor and (2) a stator, disposed circumferentially around the rotor, with multiple coil windings. When an electric current is supplied to the coil windings, the resultant interaction of the magnetic field of the coil windings and the permanent magnetic field of the magnets causes the rotor to rotate relative to the stator. The design and manufacture of radial flux motors is well-established, which is one of the primary reasons for their use in modern electric and hybrid vehicles. However, radial flux motors are limited in terms of their efficiency, size, and torque output especially when compared to other electric motor topologies.

For example, an axial flux motor may provide numerous advantages over conventional radial flux motors including a higher efficiency, a smaller size, a lower weight, and a higher torque output. In contrast to a radial flux motor, an axial flux motor includes (1) a rotor with multiple magnets disposed on a face of the rotor such that the magnetic flux lines generated by the magnets are parallel with the rotation axis of the rotor and (2) a stator that is offset along the rotation axis of the rotor with multiple coil windings. Said in another way, the rotor and the stator in the axial flux motor form a "pancake" assembly where multiple rotors and/or stators may be stacked onto one another along a common rotation axis. The integration of axial flux motors into electric and hybrid vehicles has historically been limited due to difficulties with manufacturability. However, recent advances in the design and manufacture of axial flux motors have led to renewed interest in their use in electric and hybrid vehicles.

SUMMARY

An axial flux motor (also referred to herein as a "motor") can propel a wheel of a vehicle (e.g., an electric vehicle, a hybrid vehicle). The axial flux motor includes a single rotor and two stators to reduce the overall size and weight of the motor. The motor may be modular for easier assembly and maintenance and has a spindle that supports a separate brake assembly. The motor may include an inboard housing and an outboard housing that each support a coil assembly configured to impart a torque onto a rotor. The inboard and outboard housings may together define an interior cavity that contains the stators and the rotor and may protect the stators and rotor from the external environment. The inboard and outboard housings may be joined by a ring seal used to seal the interior cavity, thus preventing unwanted infiltration of contaminants, such as dirt or water, into the interior cavity. The stators may rotate the rotor, translate a strut in a suspension, or both.

In one example, an axial flux motor includes a spindle, a first housing coaxial with and rotatable about the spindle, a second housing coaxial with and rotatable about the spindle where the first housing and the second housing forming a cavity, a seal placed between the first housing and the second housing to prevent debris and/or liquid from entering the cavity, a magnetic rotor in the cavity and rigidly connected to the spindle, a first stator assembly placed in the cavity and coaxial with the spindle to apply a first torque to the magnetic rotor, and a second stator assembly placed in the cavity and coaxial with the spindle to apply a second torque to the magnetic rotor.

The first stator assembly may be rigidly connected to the first housing and the second stator assembly may be rigidly connected to the second housing. The seal may be between opposing surfaces of the first housing and second housing. The seal may be flexible and waterproof. The seal may also allow up to 1 millimeter of motion between the first housing and the second housing. The axial flux motor may also include a wheel hub at an outboard end of the spindle to receive a wheel. The axial flux motor may also include a brake assembly outside the cavity where the brake assembly includes a brake disk rigidly fixed to the spindle and calipers to squeeze brake pads against the brake disk. Alternatively, the brake assembly may include a drum brake where a brake shoe presses against a portion of a brake drum coupled to the wheel. The brake disk and the brake drum may constitute a brake rotor and the brake caliper, and the brake shoe may constitute a brake actuator. The axial flux motor may also include an electrical conduit that extends along at least a portion of an exterior of the first housing to protect an electrical wire connected to the first stator assembly. The electrical wire may be routed to avoid unwanted twisting when the first housing rotates about the spindle. The axial flux motor may also include at least one coolant line, collocated with the electrical conduit, to convey coolant into the cavity for cooling the first coil stator assembly and/or the second coil stator assembly.

The axial flux motor may include an electrical terminal extending from the first housing and connected to the electrical wire and a torque link attached to the first housing within about 1.5 millimeters of the electrical terminal that connects the axial flux motor to a vehicle chassis. The torque link allows the spindle to move with respect to the vehicle chassis without over-tensioning the electrical wire. The axial flux motor may also include fins that extend from the first housing and/or the second housing to dissipate heat generated by the first coil stator assembly and/or the second coil stator assembly. The axial flux motor may include a first set of bearings between the spindle and the first stator assembly that allow the first stator assembly to rotate about the spindle and a second set of bearings between the spindle and the second stator assembly that allow the second stator assembly to rotate about the spindle.

In another example, an axial flux motor includes a first coil stator assembly, a second coil stator assembly separate from the first coil stator assembly, a magnetic rotor assembly sandwiched between the first and second coil stator assemblies, a first bearing assembly supporting the first coil stator assembly for rotation about a rotational axis, a second bearing assembly supporting the second coil stator assembly for rotation about the rotational axis, and a seal circumscribing the rotational axis and contacting the first housing and the second housing. The first coil stator assembly includes a first housing and a first plurality of coil assemblies mounted rigidly onto a back wall of and inside of the first housing. The second coil stator assembly includes a second housing and a second plurality of coil assemblies mounted rigidly onto a back wall of and inside of the second housing.

The first coil stator assembly may further comprise an inlet coolant flow passage extending from a front side of the first housing to at least one coolant flow channel on the back wall of the first housing. And first coil stator assembly can include an outlet coolant flow passage extending from the front side of the first housing to the coolant flow channel(s) on the back wall of the first housing. There may be a first inlet port coupled to the inlet coolant flow passage on the front side of the first housing and a first outlet port coupled to the outlet coolant flow passage on the front side of the first housing. Similarly, the second coil stator assembly may comprise a second inlet port and a second outlet port for at least one coolant flow channel of the second housing.

This version of the axial flux motor may have a first torque link having one end connected to the first housing at a first attachment point on the front side of the first housing and a second torque link having one end connected to the second housing at a second attachment point on the backside of the second housing. The first and second attachment points are opposite each other with respect to the rotational axis. The first inlet port and the first outlet port can be next to the first attachment point, and the second inlet port and the second outlet port can be next to the second attachment point. For instance, the first inlet port, first outlet port, and first attachment point can fall within a sector that has a maximum angle of less than about 40° (e.g., less than about 30°). Similarly, the second inlet port, second outlet port, and second attachment point can fall within a sector that has a maximum angle of less than about 40° (e.g., less than about 30°).

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8B shows a rear perspective view of the axial flux motor of FIG. 1.

FIG. 15A shows a cross-sectional side view of another exemplary axial flux motor where the inboard housing is partially nested in the outboard housing.

FIG. 15B shows a cross-sectional side view of another exemplary axial flux motor where the inboard housing and the outboard housing are similar in shape and dimension and joined together via a single ring seal.

FIG. 15C shows a cross-sectional side view of another exemplary axial flux motor where the inboard housing includes a sidewall housing that joins the inboard housing to the outboard housing via a single ring seal.

FIG. 15D shows a cross-sectional side view of another exemplary axial flux motor where the inboard housing and the outboard housing are coupled together by a sidewall housing and multiple ring seals.

DETAILED DESCRIPTION

Figure 1:
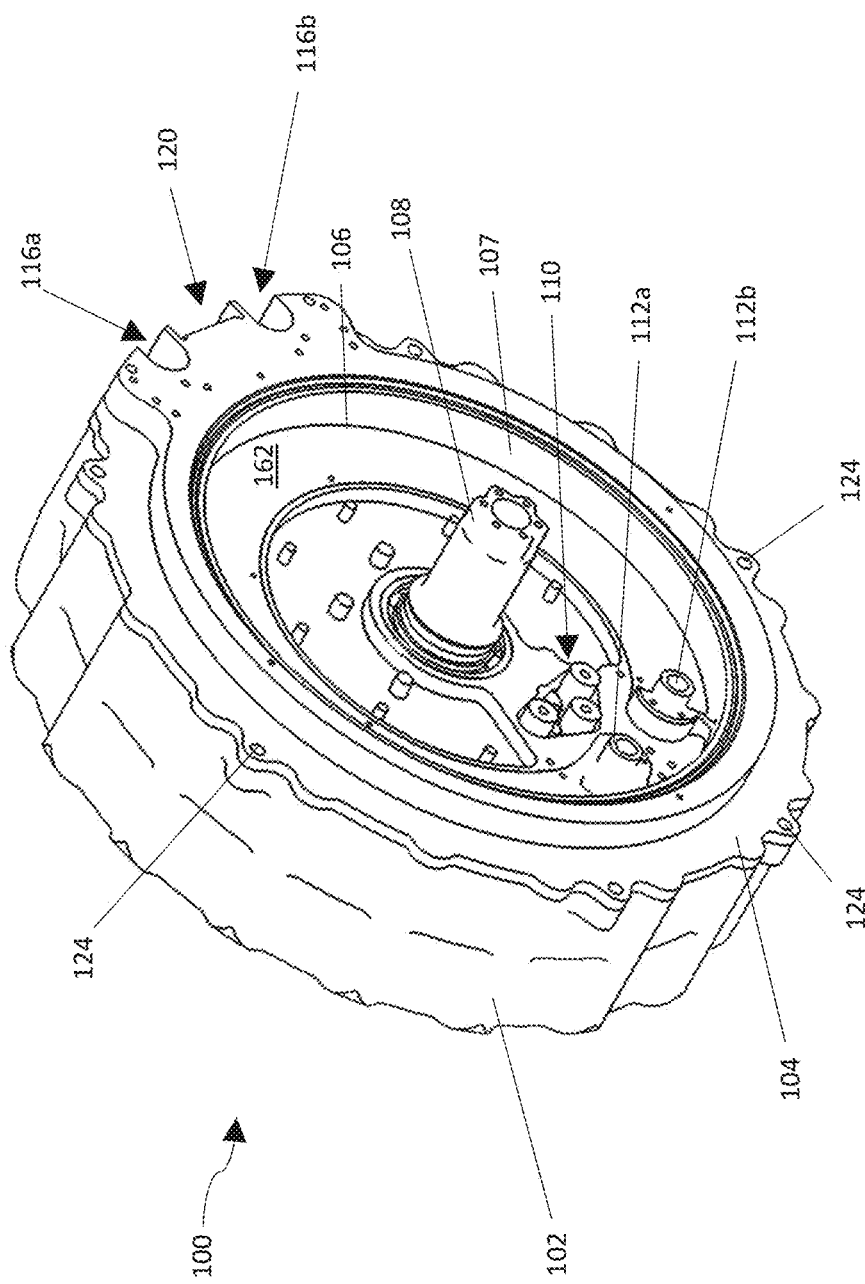
FIG. 1 shows a front perspective view of an outboard housing of an exemplary axial flux motor.

Conventional axial flux motors have been limited in terms of their manufacturability and practical use for several reasons. For instance, conventional axial flux motors often used multiple rotors and stators stacked onto one another in an alternating arrangement. The inclusion of multiple rotors and stators increases the overall size and weight of the motor. A larger and heavier motor may degrade vehicle performance by reducing vehicle range, decreasing vehicle speed, and increasing the vehicle's unsprung mass if the motor is mounted outboard with the wheel. A higher unsprung mass increases dynamic loads applied to the wheel and the tire, which may lead to more vibrations transferred to the vehicle and, hence, a poorer ride comfort. Additionally, the coil windings in the stator also generate heat during operation, which may be difficult to dissipate since cooling relies on heat conduction through the stator if the stator is between multiple rotors. The performance of the motor may thus be limited due to excessive heating of the various components of the motor.

To be practical for propelling a vehicle, an axial flux motor should be light and small enough to fit in a vehicle wheel. It should also include a casing or housing to protect the rotor(s) and the stator(s) from debris, such as dirt, rocks, or gravel on a road. This casing or housing should be sealed well enough to protect the rotor(s) and the stator(s) from contaminants (e.g., dirt, dust, brake dust). The infiltration of contaminants from the environment over time may cause the rotor and/or the stator to fail. In addition, the housing or casing should be simple to assemble and disassemble for maintenance.

An inventive axial flux motor can be light, compact, and sealed inside a casing that is easy to assemble and disassemble. It may have a single rotor between two coil stator assemblies, which may each apply a torque to the rotor. The use of a single rotor reduces the overall size and weight of the axial flux motor, enabling the motor to be mounted outboard within the hub of the wheel. The small size of the axial flux motor may allow for a more modular wheel assembly. For instance, a separate brake assembly may be mounted to the spindle rather than being integrated into the axial flux motor. The brake assembly may be a disk brake (e.g., a brake caliper and a brake disk mounted to the spindle) or a drum brake (e.g., a brake shoe and a brake drum mounted to a wheel) mounted separately from the motor to reduce the rotation of the wheel and/or an extension of the wheel. This modular assembly may improve the ease of maintenance where the axial flux motor or the brake assembly can be readily accessed and replaced without disassembly of other components.

The axial flux motor may include an inboard housing and an outboard housing that together define an interior cavity containing the rotor and the coil stator assemblies. The inboard and outboard housings may be joined together using at least one ring seal to seal the interior cavity from the external environment. Additionally, the inboard and outboard housings may dissipate heat from the two coil stator assemblies using air cooling (e.g., via fins on the exterior of the inboard housing and/or outboard housing) and/or liquid cooling (e.g., via coolant flowing through channels integrated into the inboard housing and/or outboard housing).

Each coil stator assembly can generate a torque independently from the coil stator assembly, enabling actuation along two degrees of freedom (DOF) based on the differential motion between both coil stator assemblies. In one example, each coil stator assembly may be configured to rotate about the spindle via a corresponding set of bearings. When the coil stator assemblies impart torque on the rotor in the same direction, the rotor rotates. Both coil stator assemblies may also be coupled to a suspension linkage such that when the two coil stator assemblies impart oppositely directed torques on the rotor, the rotor translates (moves linearly). In this manner, the two coil stator assemblies may provide rotation motion of the wheel and/or translational motion of the suspension, which is not possible in an axial flux motor with a single stator. The motor may also include various features (e.g., strain relief features) to reduce motion of cables (e.g., electrical cables, coolant tubing) that may cause the cables to fail as the wheel moves.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are useful for an understanding of the present implementations are described, and detailed descriptions of other portions of such known components are omitted so as not to obscure the present implementations.

An Exemplary Axial Flux Motor

Figure 2:
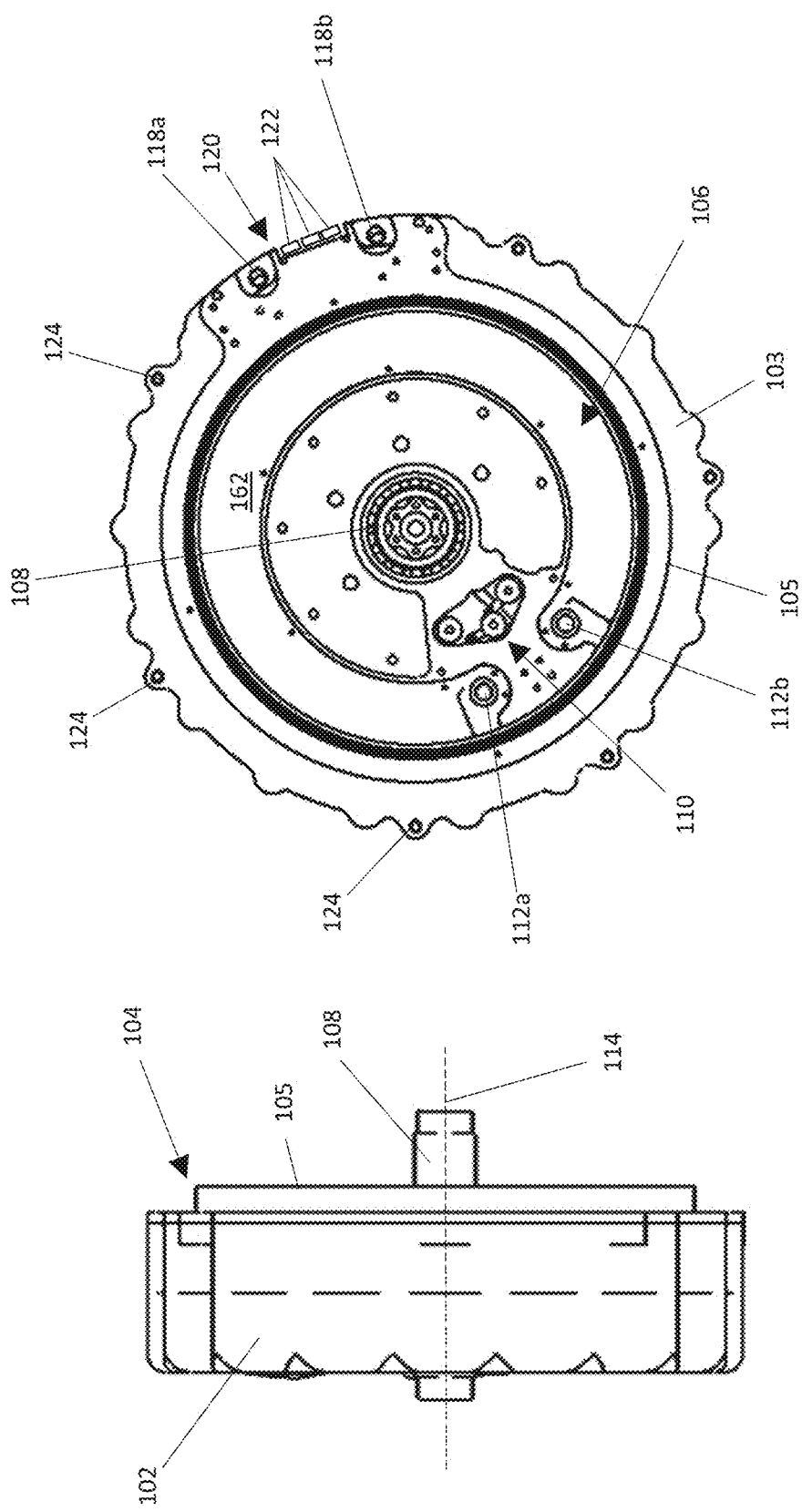
FIG. 2A shows a side view of the axial flux motor of FIG. 1 showing the outboard housing and the spindle.
FIG. 2B shows a front view of the axial flux motor of FIG. 1.

FIGS. 1, 2A, and 2B show an exemplary axial flux motor 100 that includes an outboard housing 102 and an inboard housing 106 (e.g., bell housings) that are each mounted to a central spindle 108 and are able to rotate about (a rotational axis defined by) the central spindle 108. As shown, the outboard housing 102 and the inboard housing 106 may face each other where the inboard housing 106 is nested within the outboard housing 102. Together, the outboard housing 102 and the inboard housing 106 form an internal cavity in which the other components of the axial flux motor 100 may be housed and protected from outside environmental contaminants such as dirt and water. The inboard housing 106 and the outboard housing 102 may each be formed from various materials including, but not limited to a cast aluminum and other suitable material.

Figure 3:
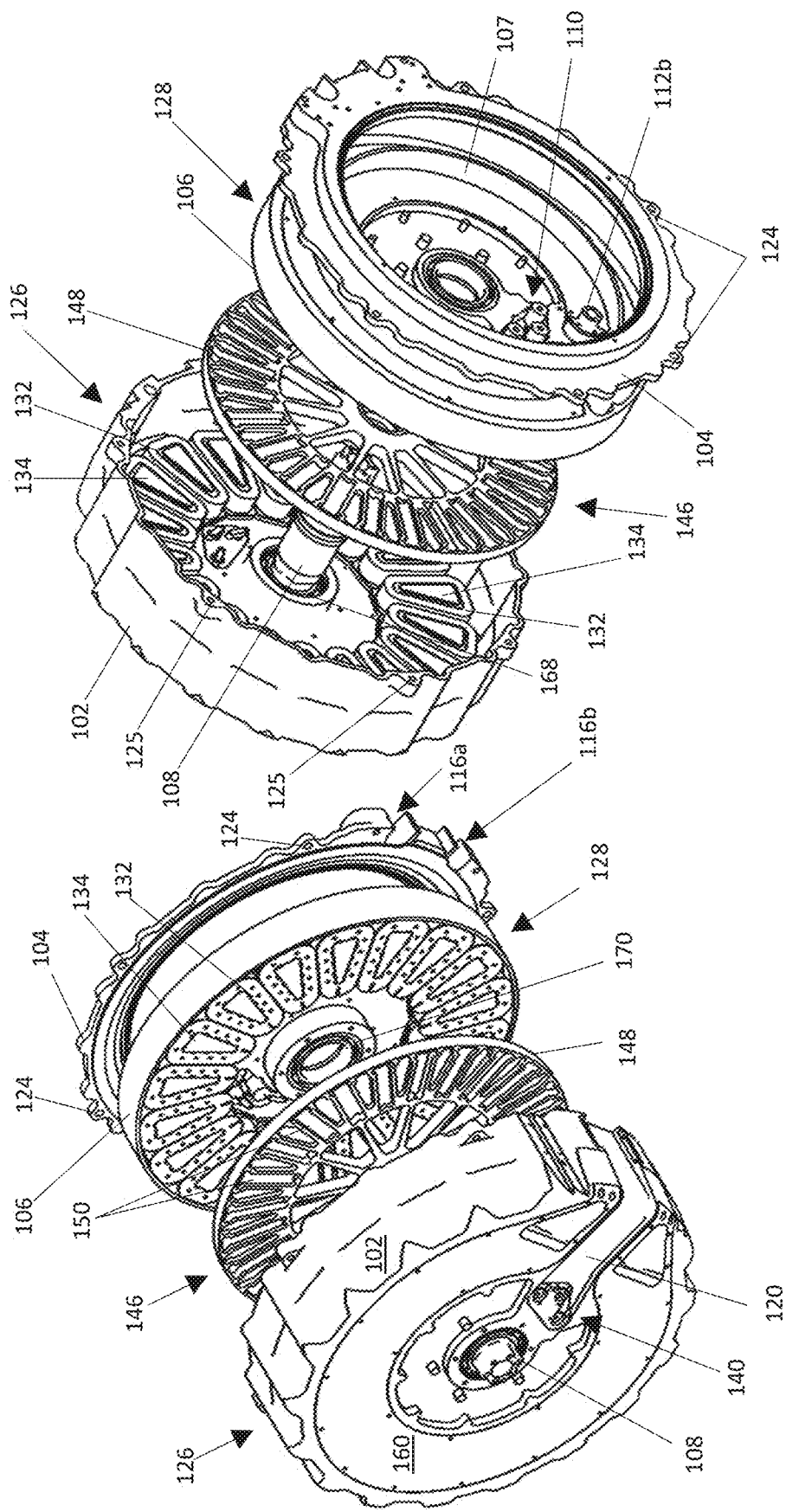
FIG. 3A shows an exploded rear perspective view of the axial flux motor of FIG. 1.
FIG. 3B shows an exploded front perspective view of the axial flux motor of FIG. 1.
Figure 7B:
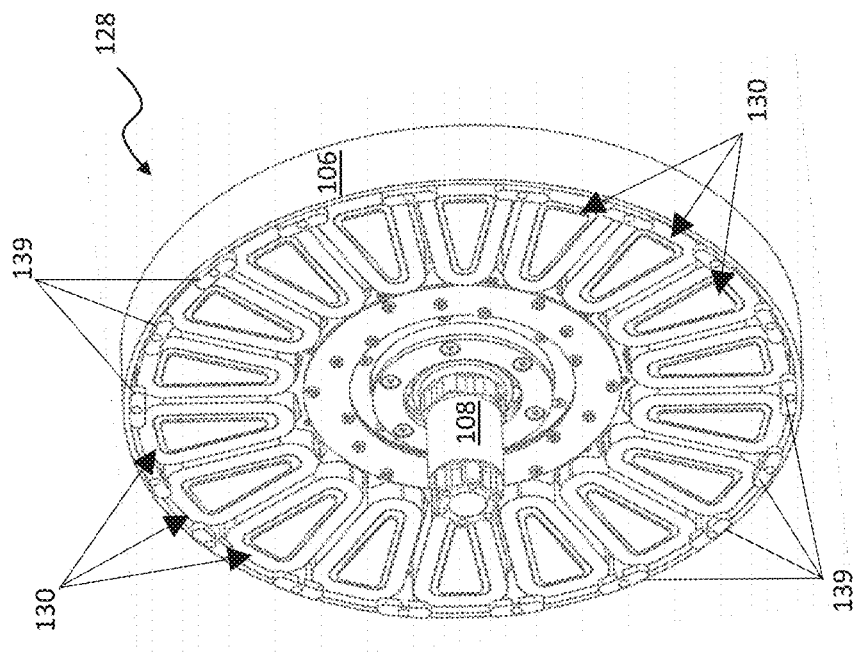
FIG. 7B shows a rear perspective view of the inboard coil stator assembly axial flux motor of FIG. 1.

FIGS. 3A and 3B show an exploded rear perspective view and an exploded front perspective view of the motor 100, respectively. As shown, the motor 100 may be subdivided into three primary components: a coil stator assembly 126 affixed to the outboard housing 102, a coil stator assembly 128 affixed to the inboard housing 106, and a magnetic rotor assembly 146 sandwiched between the two coil stator assemblies 102 and 106. There may be an array of coil assemblies 130 (see FIG. 7A) affixed rigidly to the interior rear wall of the outboard housing 102. The array of coil assemblies 130 may be equally spaced around the rotational axis 114. Similarly, there may be another array of coil assemblies 130 (see FIG. 7B) rigidly affixed to the interior back wall of the inboard housing 106. These coil assemblies 130 may also be equally spaced around the rotational axis 114. The two arrays of coil assemblies 130 may be identical (i.e., the coil assemblies are the same, the number of coil assemblies is the same, and their radial locations on their respective housings are the same). In the outboard coil stator assembly 126, the coil assemblies 130 may be held in place by a set of clamps 138 located around the outer perimeter of the array of coil assemblies 130 (see FIG. 7A) and screwed into the outboard housing 102. In the inboard coil stator assembly 128, the coil assemblies 130 may be held in place by another set of clamps 139 located around the outer perimeter of the array of coil assemblies 130 (see FIG. 7B) and screwed into the inboard housing 102. Similar clamps located around the inner perimeter of the coil assemblies are used to anchor the coil assemblies to the housings (not visible in the figures).

Each coil assembly may include a core 134 and a copper winding 132 wound around that core 134. The cross-section of the core 134 in a plane that is perpendicular to the rotational axis 114 may be approximately a truncated pie shape. The windings 132 may be wound around an axis that is parallel to the rotational axis of the motor 100, therefore producing a magnetic field that is largely oriented axially. The cores 134 may be made formed from various materials with a relatively high magnetic permeability including, but not limited to sintered steel.

The magnetic rotor assembly 146 may be a circular disk structure 148 that holds an array of permanent magnets 150. The permanent magnets 150 may be similar to the coil assemblies 130 in that the magnets 150 are equally spaced around the rotational axis 114. The magnetizations of the magnets 150 may be oriented parallel to the rotational axis 114 and may alternate in direction from one magnet to the next (e.g., the magnetizations are oriented towards the inboard housing 106 or the outboard housing 102) around the array of magnets 150. The circular disk structure 148 that holds the magnets 150 may be a ribbed structure with pockets which hold the magnets 150. The magnets 150 and the pockets into which they fit may be rectangularly shaped, leaving wedge shaped regions between the magnets 150. As shown in FIGS. 3A and 3B, material may also be removed from these areas to reduce the weight of the magnetic rotor assembly 146. In the exemplary motor 100, there are 24 magnets in the array of permanent magnets 150 and 18 coil assemblies 130 in each array of coil assemblies.

Figure 4:
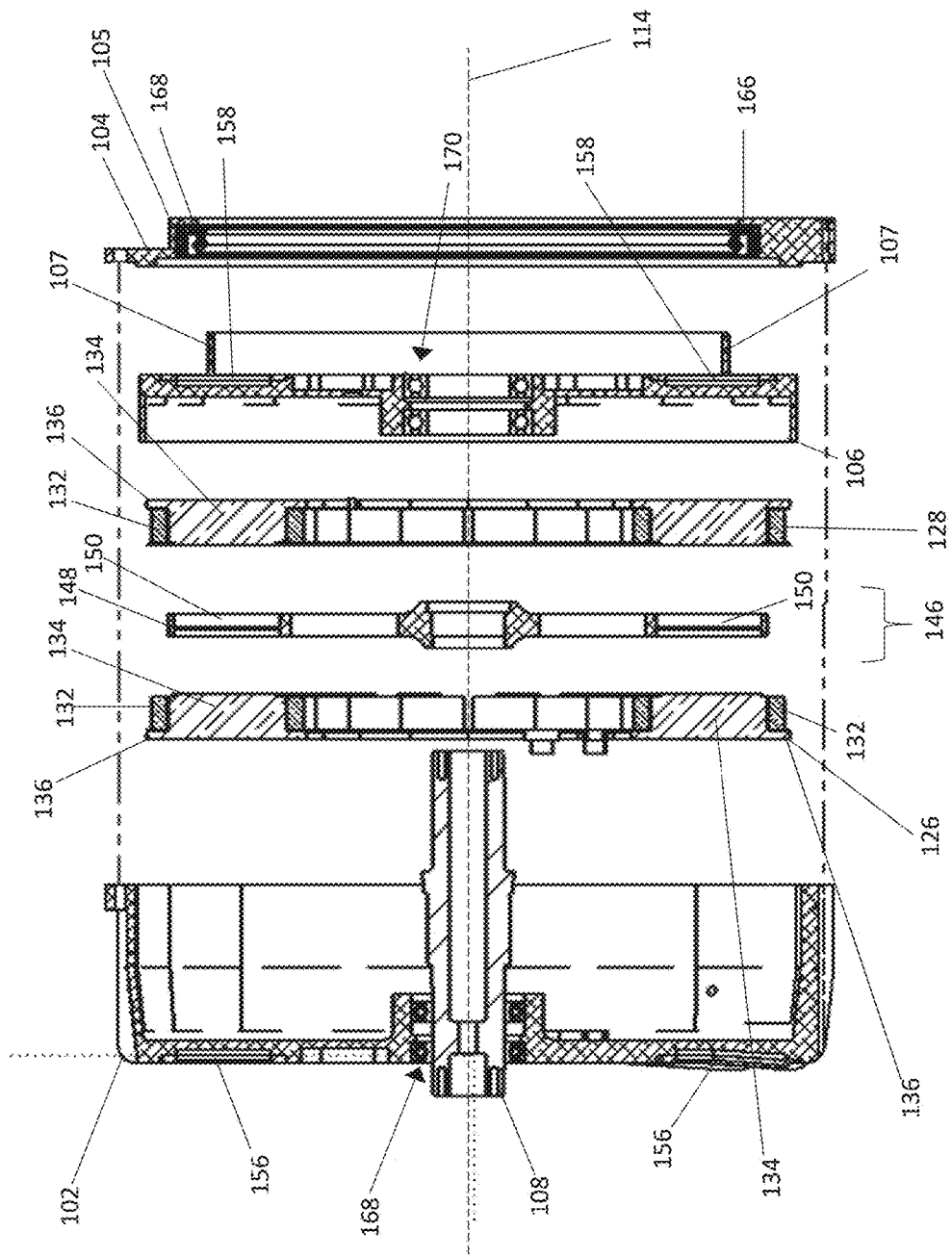
FIG. 4 shows an exploded cross-sectional side view of the axial flux motor of FIG. 1 showing the outboard housing, the magnetic rotor assembly sandwiched between the two coil assemblies, and the inboard housing.

FIG. 4 shows each core 134 may have a flange 136 circumscribing the side of the core 134 that contacts the housing. The flange 136 may have a depth that approximately equals the thickness of the core winding. The core 134 and flange 136 may be made of a sintered steel with a relatively high magnetic permeability. The flange 136 may contain the magnetic field produced by the coil. The side of each core 134 (with the flange 136) may be placed in good thermal contact with the housing to which it is rigidly attached for better heat dissipation.

The outboard housing 102 may have three electrical terminals 140, which may be electrically connected through the housing to the array of coil assemblies 130 in the coil stator assembly 126. The terminals 140 may provide three-phase drive signals to the coils 130 to generate a relative torque between the magnetic rotor assembly 146 and the coil stator assembly 126. Similarly, the inboard housing 106 may also have three electrical terminals 110, which may be electrically connected through the housing to the array of coil assemblies 130 in the coil stator assembly 128. These terminals 110 may provide three-phase drive signals to the coils 130 to generate a relative torque between the magnetic rotor assembly 146 and the coil stator assembly 128.

FIG. 4 also shows the magnetic rotor assembly 146 may be rigidly attached to the spindle 108. The magnetic rotor assembly 146 and the spindle 108 may be fabricated as a single part or as multiple parts that are then assembled after fabrication. Drive signals to the coil assemblies 130 may therefore cause the magnetic rotor assembly 146 and the spindle 108 to rotate together. The outboard housing 102 may be supported on the spindle 108 by a set of bearings 168, which enables the outboard housing 102 to rotate relative to the spindle 108 (or the spindle 108 to rotate relative to the outboard housing 102). Similarly, the inboard housing 106 may be supported on the spindle 108 by bearings 170, which enable the inboard housing 106 to rotate relative to the spindle 108 (or the spindle 108 to rotate relative to the inboard housing 106).

Figure 6:
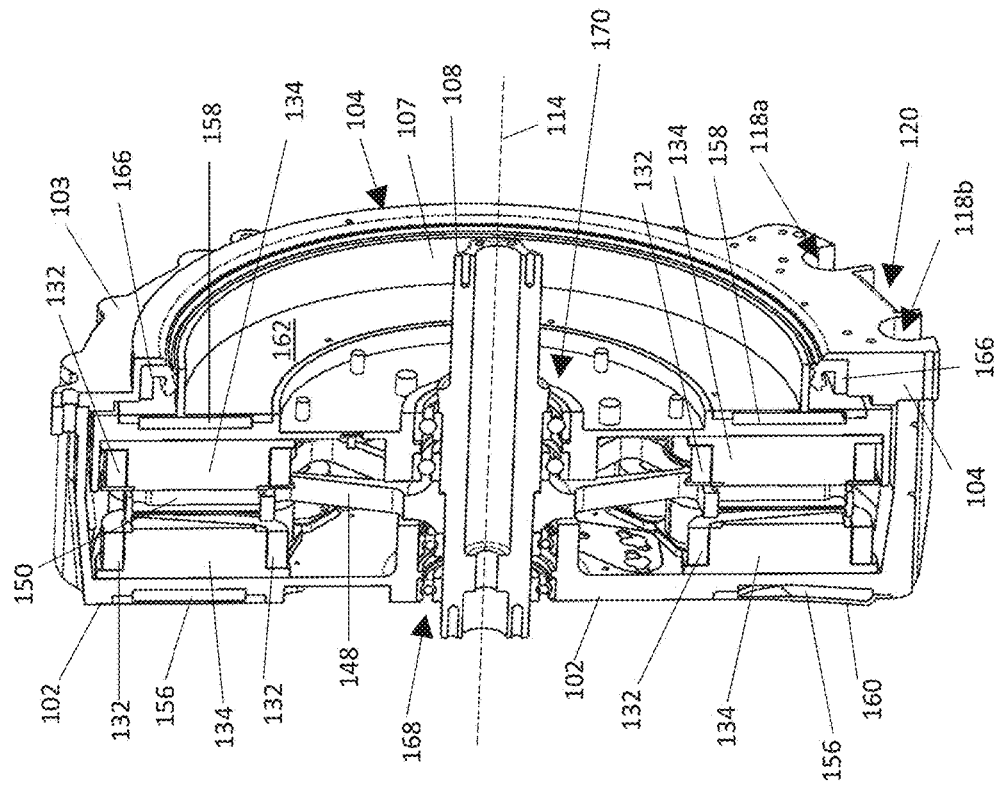
FIG. 6 shows a cross-sectional front perspective view of the axial flux motor of FIG. 1.
Figure 5:
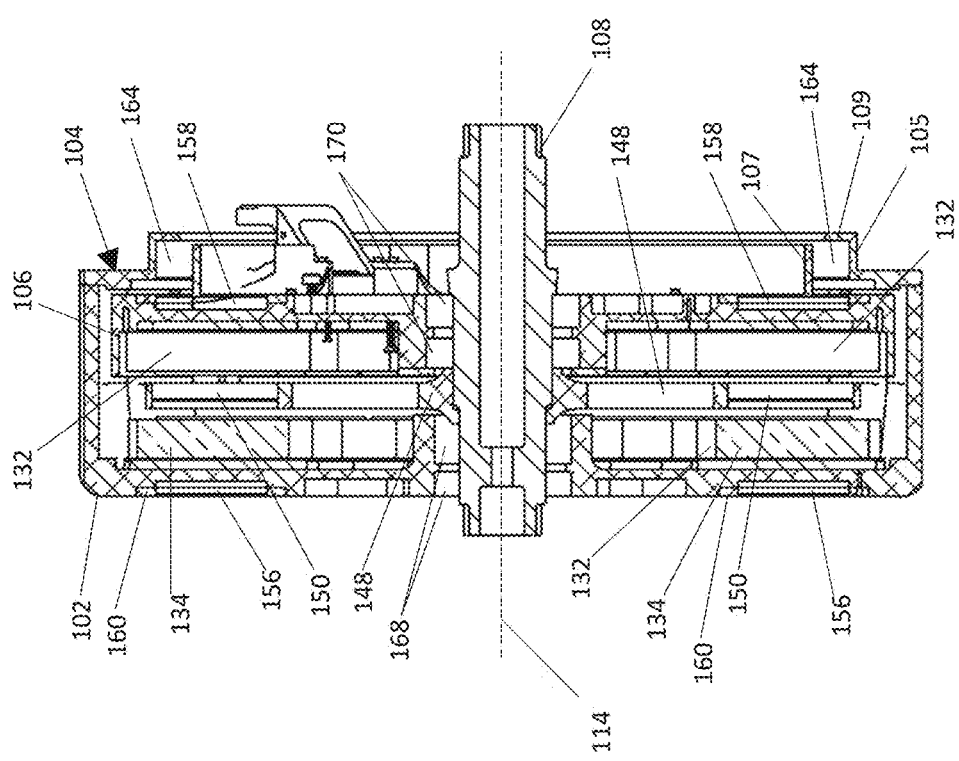
FIG. 5 shows a cross-sectional side view of the axial flux motor of FIG. 1.

FIGS. 5 and 6 show additional cross-sectional views of the coil stator assemblies 126 and 128 with respect to the spindle 108. The coil stator assemblies 126 and 128 may each rotate about the rotation axis 114 independently from each other absent mutual external mechanical or magnetic coupling (e.g., a mechanical linkage connecting the two coil stator assemblies 126 and 128). Independent motion of the coil stator assemblies 126 and 128 is based, in part, on the exclusion or neglect of parasitic forces, such as a frictional force from a ring seal or aerodynamic coupling between the coil stator assemblies 126 and 128. In a practical axial flux motor, parasitic forces may cause some small, albeit non-negligible coupling between the coil stator assemblies 126 and 128.

Because the coil stator assemblies 126 and 128 can move independently, absent any external linkage, they may not be aligned to one another during operation. For example, FIGS. 5 and 6 show the coil stator assemblies 126 and 128 at rotated relative to one another. In FIGS. 4 and 6, the two coil stator assemblies 126 and 128 are shown as aligned with each other, hence the cross-sectional views of the respective coil assemblies 130 look similar (e.g., the two cores 134 for each coil assembly 130 are shown). In contrast, FIG. 5 shows the two stator assemblies 126 and 128 in an unaligned position where only the windings 132 of the inboard coil assembly 130 are shown whereas the cores 134 and the windings 132 of the outboard coil assembly 130 are shown.

The inboard housing 106 and magnetic rotor assembly 146 may be enclosed within the outboard housing 106 by a ring (or cover) 104 (e.g., a sealing ring plate). The ring 104 may have a flange 103 with several bolt holes 124 disposed around the perimeter that align with corresponding threaded holes 125 in the outboard housing 102. Bolts may be inserted through the holes 124 to fasten the ring 104 onto the outboard housing 102. A ring seal 166 may then be disposed between the inboard housing 106 and the assembly of the outboard housing 102 and the ring 104 to allow the coil stator assemblies 126 and 128 to rotate relative to one another. In other configurations, the ring 104 may be omitted or integrated as part of the inboard housing 106 or the outboard housing 102 as described below.

Inboard and Outboard Axial Flux Motor Housings

FIGS. 1-8 show the inboard housing 106 and the outboard housing 102 may each be a bell housing. The inboard housing 106 may include a cylindrical wall 107 that extends from the side of the inboard housing 106 supporting the core 134. The ring 104 may have a raised cylindrical collar 105 into which the cylindrical wall 107 of the inboard housing 106 fits when the ring 104 is assembled onto the outboard housing 102. The cylindrical collar 105 may also have an inward extending lip 109. The inner diameter of the raised cylindrical collar 105 may be larger than the outer diameter of the region defined by the cylindrical wall 107 such that the cylindrical collar 105 with the lip 109 and the cylindrical wall 107 form a cavity 164 (see FIG. 5) between the two components to accommodate a double-lipped ring seal 166 (see FIG. 6). The ring seal 166 may be mounted within the collar 105 such that an exterior surface of the ring seal 166 abuts an interior surface of the collar 105 and a side of the ring seal 166 abuts the collar lip 109. The interior surface of the ring seal 166 may have a flexible, double lip, which rides against the exterior surface of the cylindrical wall 107 of the inboard housing 106 when the inboard housing 106 rotates within the outboard housing 102.

The ring seal 166 may form a seal between the interior cavity and the ambient environment even as the inboard housing 106 rotates relative to the outboard housing 102. The seal may prevent unwanted debris, such as dirt or water, from infiltrating the interior cavity of the axial flux motor 100. Furthermore, the extent by which the inboard housing 106 and the outboard housing 102 may rotate independent from one another may also depend on the amount of frictional force between the ring seal 166 and the cylindrical wall 107. In some cases, the ring seal 166 may allow the inboard housing 106 and the outboard housing 102 to move with respect to each other by up to about 1 mm total (e.g., each stator can move with respect to the rotor by about 0.5 mm for a total range of motion of 1 mm).

The ring seal 166 may be flexible and/or waterproof or water-resistant. Additionally, the ring seal 166 should remain compliant throughout a desired operating temperature range and/or duration of a desired operating lifetime. The ring seal 166 should also be compatible with materials used in the fabrication of the motor 100 and foreign liquids encountered during operation (e.g., water, oil, dirt). The ring seal 166 should also be configured to withstand the infiltration of a liquid (e.g., coolant, water) when the motor 100 is immersed in the liquid. For instance, the ring seal 166 may be rated to withstand liquid infiltration at a desired pressure.

The inboard housing 106 and the outboard housing 102 may have other shapes and/or dimensions that form a sealed cavity when assembled. The shape and/or dimensions of the inboard housing 106 and the outboard housing 102 may depend on several factors including, but not limited to constraints on the overall size of the motor 100, the desired volume of the interior cavity containing the coil stator assemblies 126 and 128 and the magnetic rotor assembly 146, and the ease with which the interior cavity is sealed from the external environment.

FIGS. 15A-15D show several other exemplary motors 1500a-1500d with different designs and assemblies of the inboard housing 1506 and outboard housing 1502. For example, FIG. 15A shows a motor 1500a where the inboard housing 1506a and the outboard housing 1502a are once again each a bell housing. As before, the inboard housing 1506a and the outboard housing 1502a define an interior cavity 1564 when assembled. The inboard housing 1506a supports an inboard coil assembly 1528 and the outboard housing 1502a supports an outboard coil assembly 1526. The coil assemblies 1526 and 1528 may rotate a magnetic rotor assembly 1546 rigidly fixed to a spindle 1508 as described above. The inboard housing 1506a and the outboard housing 1502a are also configured to rotate about the spindle 1508 via respective sets of bearings 1570 and 1568. However, unlike the inboard housing 106 and the outboard housing 102 shown in FIGS. 1-8, the inboard housing 1506a and the outboard housing 1502a may be coupled directly to one another via a ring seal 1504a without a separate ring, thus simplifying the design and assembly of the motor 100. As shown, the inboard housing 1506a may be partially nested in the outboard housing 1502a.

FIG. 15B shows another motor 1500b where the inboard housing 1506b and the outboard housing 1502b are again bell housings. In this case, the inboard housing 1506b and the outboard housing 1502b may be substantially identical parts coupled directly to one another via a ring seal 1504b. By designing the inboard housing 1506b and the outboard housing 1502b to be similar, manufacturing costs may be reduced since the same part may be used as either the inboard housing 1506b or the outboard housing 1502b.

FIG. 15C shows another motor 1500c where the inboard housing 1506c and the outboard housing 1502c are flat plates (e.g., circular, rectangular, or another shape). As shown, the inboard housing 1506c (or outboard housing 1502c) may be coupled to a sidewall housing 1510 (e.g., via bolts or other suitable fasteners). The sidewall housing 1510 may have various shapes dependent on the shape of the inboard housing 1506c and the outboard housing 1502c. For example, the sidewall housing 1510 may be cylindrical if the inboard housing 1506c and the outboard housing 1502c are circular plates, with the assembly of the sidewall housing 1510 and the inboard housing 1506c may define a bell-shaped housing. The inboard housing 1506c and the sidewall housing 1510 may be joined with the outboard housing 1502c via a ring seal 1504c to form the enclosed cavity 1564. This design may be preferable in that the inboard housing 1506c and the outboard housing 1502c have a simpler geometry and, hence, easier to manufacture.

FIG. 15D shows another motor 1500d where the inboard housing 1506d and the outboard housing 1502d are again flat plates. In this case, however, the inboard housing 1506d and the outboard housing 1502d may both be joined to a sidewall housing 1510 via ring seals 1504e and 1504d, respectively. In this manner, the inboard housing 1506d, the outboard housing 1502d, and the sidewall housing 1510 may each rotate independently from one another. The sidewall housing 1510 may be mechanically coupled to another part of the vehicle (e.g., the chassis, the frame, the suspension upright) to provide a fixed mechanical reference, at least with respect to the inboard housing 1506d, the outboard housing 1502d, and the magnetic rotor assembly 1546.

Liquid Cooling for an Axial Flux Motor

FIGS. 1-8 show a liquid coolant system integrated into each of the housings 102 and 106. Liquid cooling may be preferable in cases where air cooling is not feasible due to insufficient air flow and/or exposed surfaces that are too small for air to dissipate heat. Additionally, liquid cooling may also allow heat to be transported from the motor 100 to another area of the vehicle where air cooling is more practical (e.g., a higher air flow and/or larger surface area). The liquid coolant system may also utilize onboard plumbing subsystems in the vehicle to generate the flow of coolant, thus enabling a higher power density motor 100.

As shown, the rear wall of the outboard housing 102 may include a coolant flow passage 156 that extends around the periphery of the rear wall such that coolant flowing through the coolant flow passage 156 may be proximate to the coil assemblies 130 mounted on the interior side of the rear wall of the outboard housing 102 for good thermal contact. Similarly, the back wall of the inboard housing 106 may also include a coolant flow passage 158 that extends around the periphery of the inboard housing 106. Again, liquid coolant flowing through the coolant flow passage 158 may be proximate to the coil assemblies 130 disposed on the interior side of the back wall of the inboard housing 106 for good thermal contact. As shown, the coolant flow passages 156 and 158 may be formed as recessed channels on the respective rear wall of the outboard housing 102 and the back wall of the inboard housing 106. The recessed channels of the outboard housing 102 and the inboard housing 106 may each be covered by a plate 160 and 162, respectively, to enclose the respective coolant flow passages. The coolant flow passages 156 and 158 may be shaped to reduce cavitation and/or undesirable fluid currents that may cause damage or wear over time. The coolant flow passages 156 and 158 may also include a bleed valve to facilitate removal of unwanted air bubbles within the liquid coolant system.

In other configurations, the cover plates 160 and 162 may define at least a portion of the coolant flow passages 156 and 158. The cover plates 160 and 162 may then be coupled to a substantially flat surface of the outboard housing 102 and the inboard housing 106, respectively. This configuration may enable the cover plates 160 and 162 to function as a modular liquid cooling system that may be readily separated and/or replaced with other cooling devices (e.g., heat fins for air cooling). Additionally, the cover plates 160 and 162 and the housings 102 and 106 may be formed from different materials. For example, the cover plates 160 and 162 may be formed from aluminum and the housings 102 and 106 may be formed from magnesium or other lighter weight materials. The coolant may be various types of fluids including, but not limited to water and glycol-based coolants.

With respect to the inboard housing 106, the cover plate 162 may include a coolant inlet channel 112a and a coolant outlet channel 112b for coolant to flow into and out of the coolant flow passage 158, respectively. FIG. 2B shows the coolant channels 112a and 112b may be located at opposite ends of the cover plate 162. In order to facilitate connection to an cooling system (e.g., a pump, a radiator), FIG. 10 further shows the coolant inlet channel 112a and the coolant outlet channel 112b may be coupled to a coolant inlet port connector 113a and a coolant outlet port connector 113b, respectively, for attaching flexible tubing (not shown) to the cooling system. The coolant port connectors 113a and 113b may both be disposed on the inboard side of the motor 100.

Figure 7A:
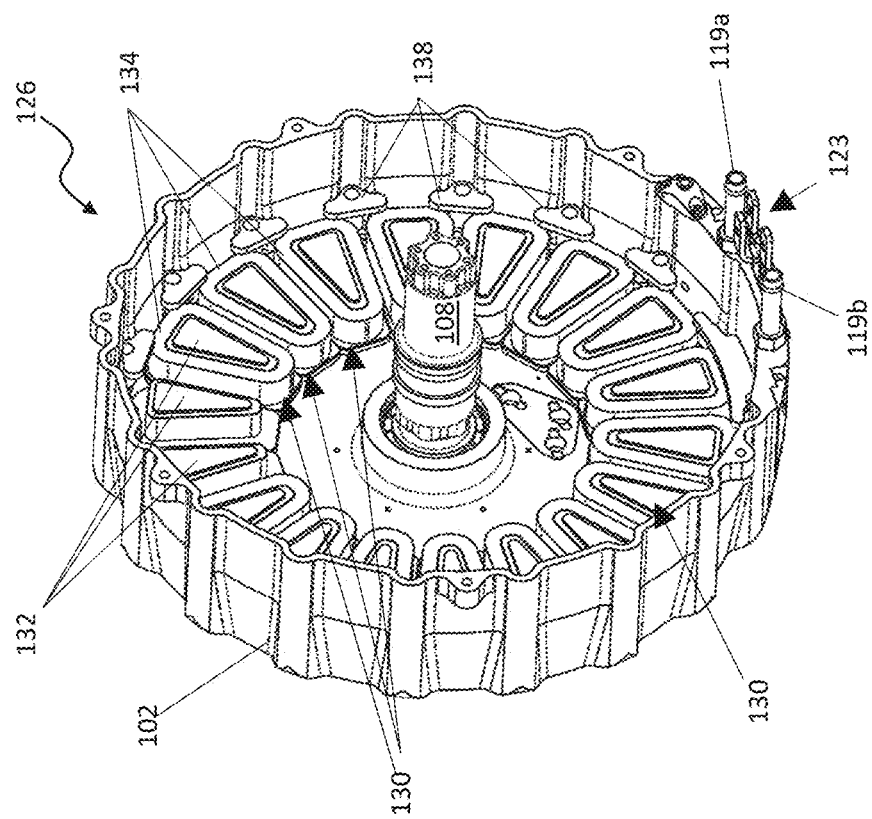
FIG. 7A shows a front perspective view of the outboard coil stator assembly in the axial flux motor of FIG. 1.
Figure 9:
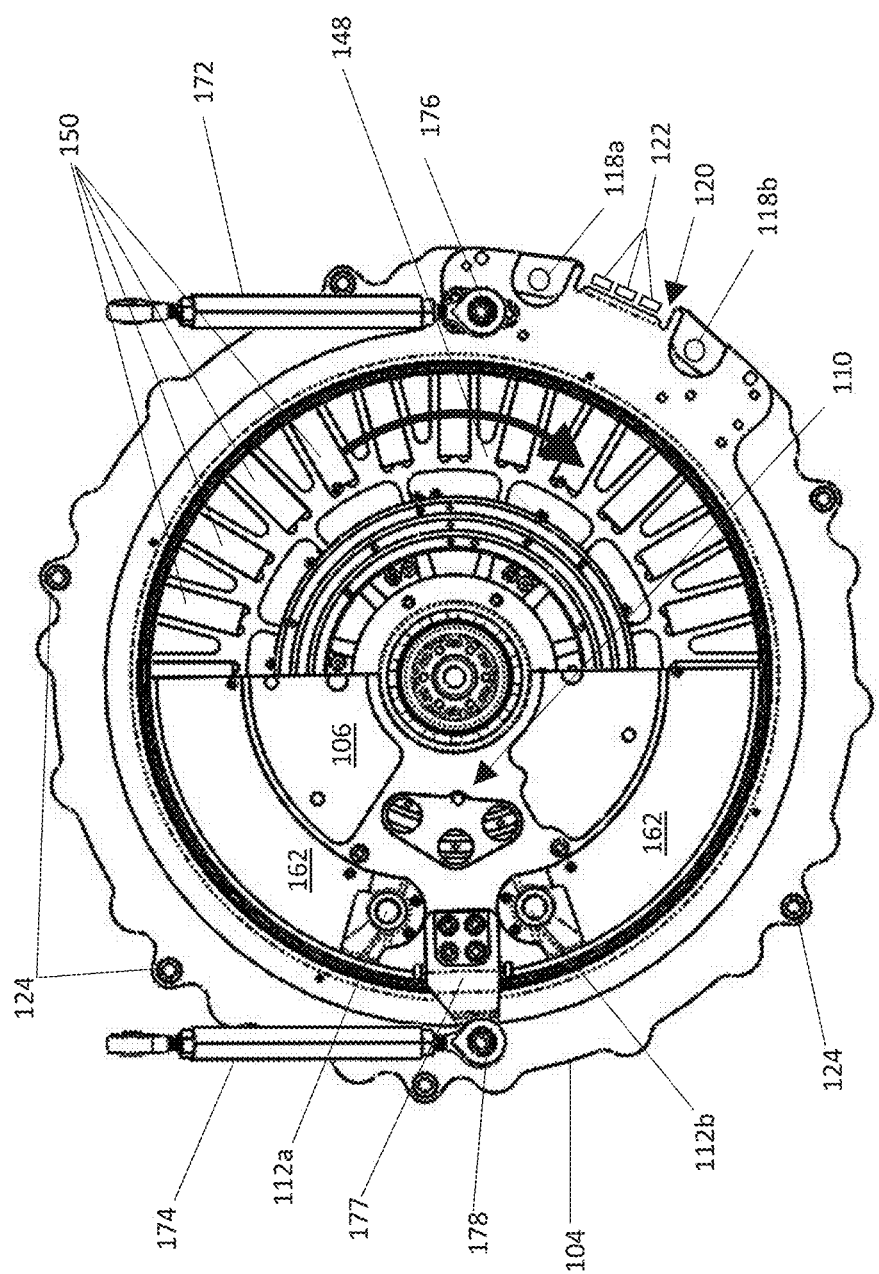
FIG. 9 shows a partial cutaway front view of the axial flux motor of FIG. 1.
Figure 13:
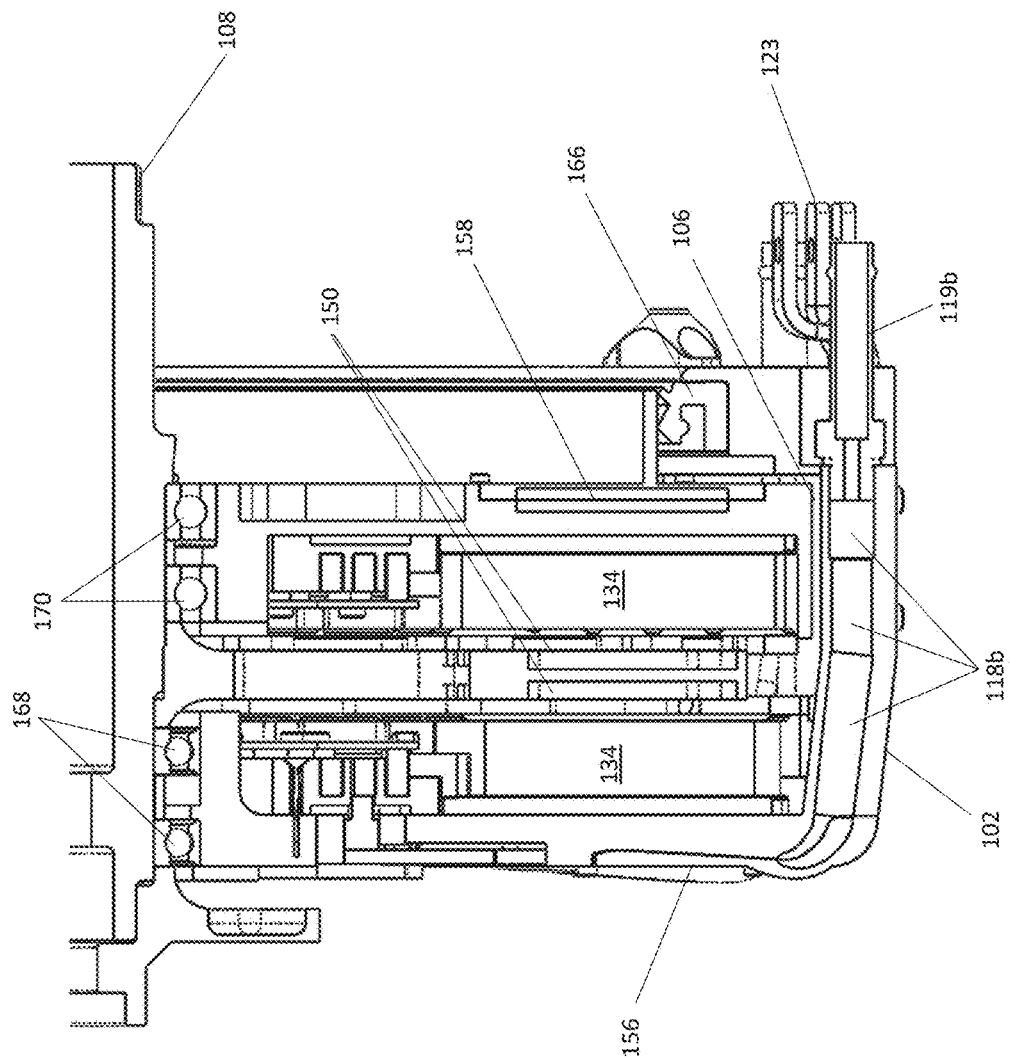
FIG. 13 shows a partial cross-sectional side view of the axial flux motor of FIG. 1 showing one of the coolant channels connecting the outboard coolant flow passage to the inboard side of the motor.

With respect to the outboard housing 102, the coolant flow passage 156 may include a coolant inlet channel 118a and a coolant outlet channel 118b for coolant to flow into and out of the coolant flow passage 156, respectively. FIGS. 6 and 9 show the coolant channels 118a and 118b may be formed into the outboard housing 102 at opposing ends of the coolant flow passage 156. As shown, the coolant channels 118a and 118b may extend along the side of the housing 102 from the rear side of the housing 102 where the coolant flow passage 156 is located to the front of the housing 102 where the ring 104 is attached. In this manner, the coolant channels 118a and 118b may be disposed on the same side as the coolant channels 112a and 112b (i.e., on the inboard side of the motor 100), thus improving ease of connectivity with the tubing used to flow coolant through both the coolant passages 156 and 158. FIG. 13 further shows the coolant outlet channel 118b extending along the side of the outboard housing 102. FIG. 7A shows the coolant channels 118a and 118b may each be coupled to a coolant inlet port connector 119a and a coolant outlet port connector 119b, respectively, for attaching flexible tubing (not shown) to the cooling system. It should also be noted that the inlet and outlet port connectors 119a and 119b are also located on the inboard side of the motor 100.

Air Cooling for an Axial Flux Motor

In another example, the motor 100 may be cooled convectively via a flow of air across the motor 100 as the vehicle moves and/or the wheel rotates. Convective cooling may include both natural convection (e.g., when the vehicle is at a low speed) and forced convection (e.g., when the vehicle is at a high speed). The various components of the motor 100, such as the inboard housing 106 and the outboard housing 102, may also have a sufficient heat capacity to temporarily store some of the heat generated by the coil stator assemblies 126 and 128 such that the motor 100 does not overheat when the vehicle is moving from a static position. The motor 100 may also include an onboard temperature monitoring system that prevents the motor 100 from overheating (i.e., exceeding an operating temperature threshold) in cases where convective cooling is not sufficient to dissipate the heat and the heat cannot be sufficiently absorbed by the components of the motor 100.

Convective heat transfer may be enhanced by integrating one or more cooling fins on the exterior surfaces of the motor 100 (e.g., the outboard housing 102, the inboard housing 106, and/or the ring 104) to increase the surface area available for convective heat transfer. The cooling fins may be formed directly onto the outboard housing 102, the inboard housing 106, and/or the ring 104 using various manufacturing processes including, but not limited to sheet metal pressing, casting, molding, welding, brazing, or machining.

Figure 16A:
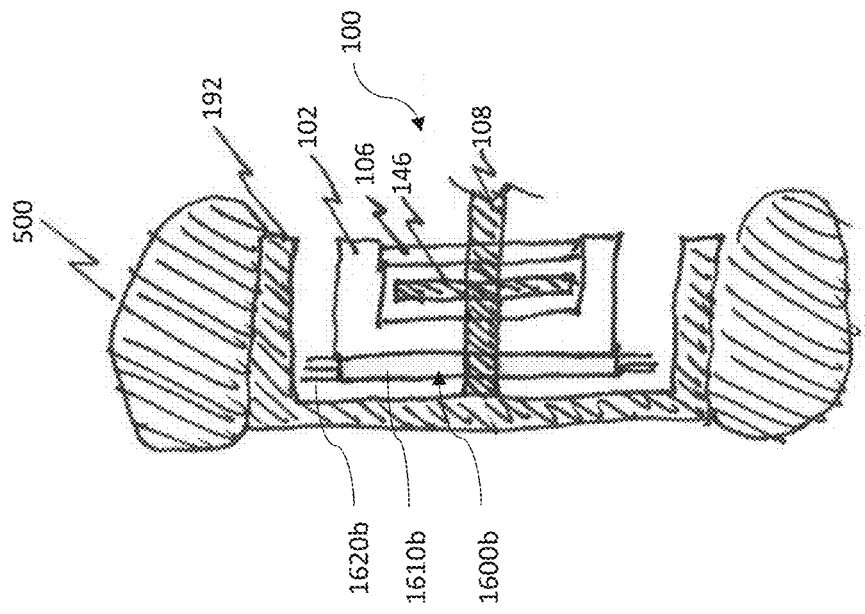
FIG. 16A shows a cross-sectional side view of another exemplary axial flux motor and wheel assembly with cooling fins disposed in an inboard configuration with respect to the wheel assembly.
Figure 16B:
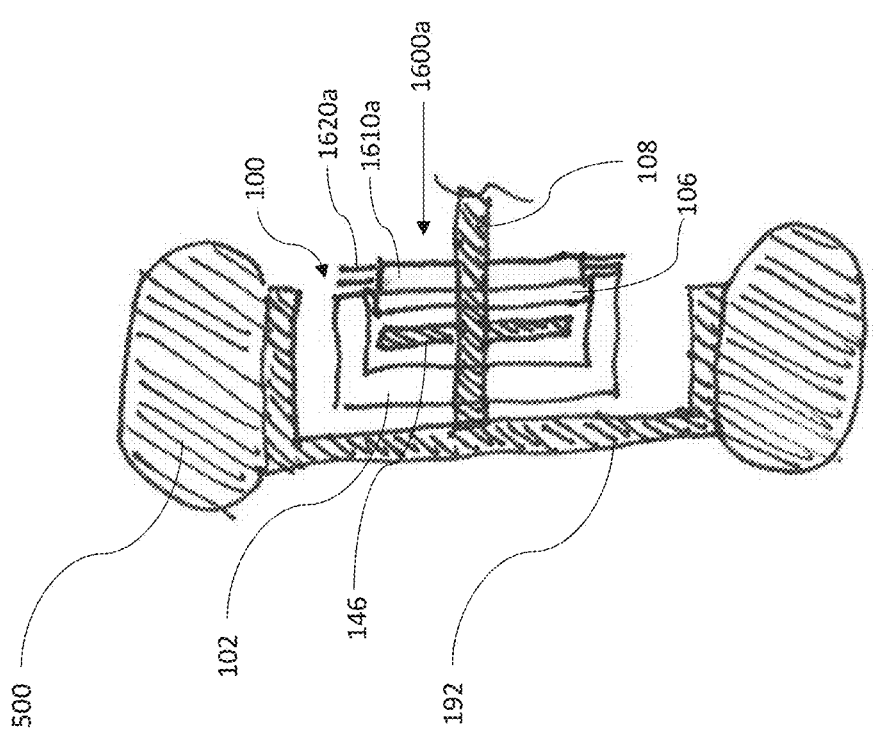
FIG. 16B shows a cross-sectional side view of another exemplary axial flux motor and wheel assembly with cooling fins disposed in an outboard configuration with respect to the wheel assembly.

Alternatively, a cooling hub with cooling fins may be mounted to the motor 100 to dissipate heat generated by the coil stator assemblies 126 and 128. FIG. 16A shows a cooling hub 1600a coupled to the inboard housing 106. And FIG. 16B shows a cooling hub 1600b coupled to the outboard housing 102. In some designs, there may be cooling hubs 1600a and 1600b on the inboard housing 106 and the outboard housing 102.

As shown in FIG. 16A (16B), the cooling hub 1600a (1600b) may include a hub 1610a (1610b) and cooling fins 1620a (1620b). The hub 1610a (1610b) may be coupled to the motor 100 using bolts or other fasteners. In some cases, a thermal paste, epoxy, or adhesive may be disposed between the hub 1610a (1610b) and the surface of the motor 100 (e.g., the inboard housing 106 or the outboard housing 102) to which the cooling hub 1600a (1600b) is mounted to increase thermal conductivity. The cooling hub 1600a (1600b) may be formed from a thermally conducting material including, but not limited to aluminum. Additionally, the cooling hub 1600a (1600b) may also be formed using various manufacturing processes including, but not limited to sheet metal folding, casting, molding, welding, brazing, or machining.

Figure 16C:
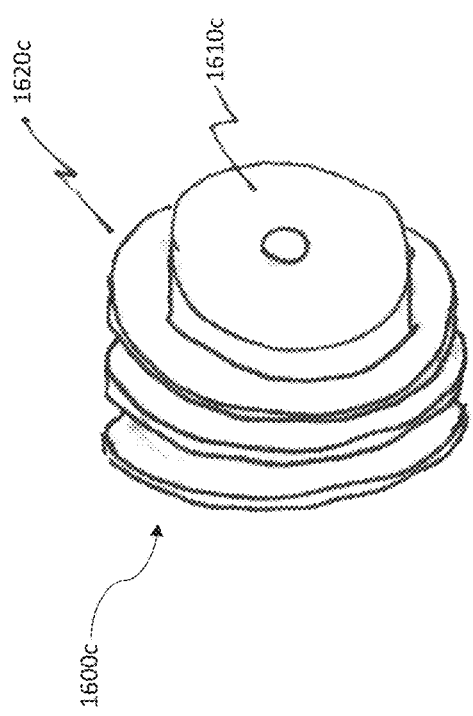
FIG. 16C shows a front perspective view of an exemplary cooling hub with disk fins disposed along the periphery of the hub.
Figure 16D:
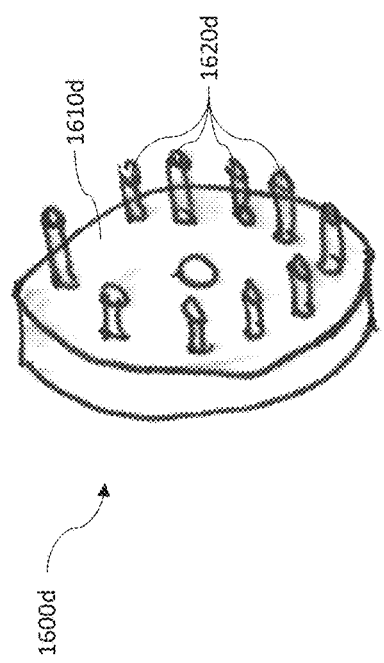
FIG. 16D shows a front perspective view of another exemplary cooling hub with pin fins disposed on the face of the hub.

FIG. 16C shows one exemplary cooling hub 1600c with cooling fins 1620c that are disk fins disposed around the periphery of a hub 1610c. FIG. 16D shows another exemplary cooling hub 1600d where the cooling fins 1620d are pin fins disposed on the face of the hub 1610d. As shown, the hub 1610d may include a central opening through which the spindle 108 may pass through. The hub 1610d may be supported by its own set of bearings or may rely upon the bearings 168 and/or 170 to rotate about the spindle 108.

Figure 17A:
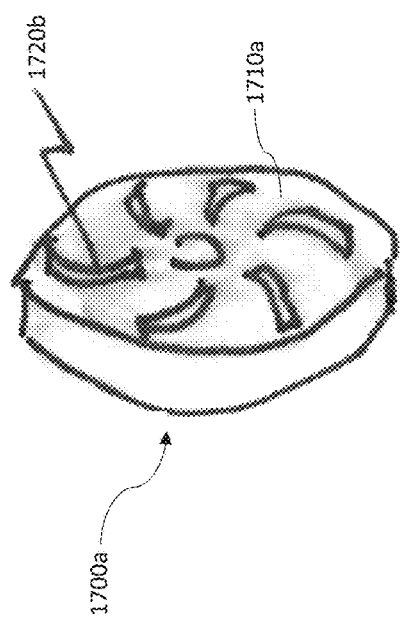
FIG. 17A shows a front perspective view of another exemplary cooling hub with blades disposed on the face of the hub to function as a centrifugal blower.
Figure 17B:
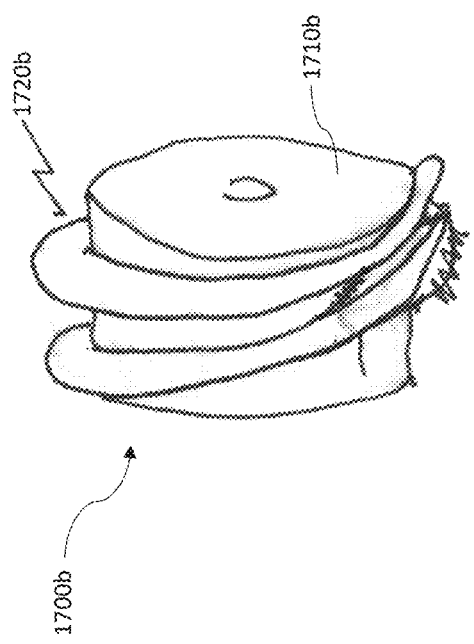
FIG. 17B shows a front perspective view of another exemplary cooling hub with spiral blades disposed along the periphery of the hub.

In some cases, the cooling fins may also be shaped and/or dimensioned to manipulate the flow of air across the motor 100 to further enhance cooling. For example, FIG. 17A shows an exemplary cooling hub 1700a with curved fins 1720a disposed on the face of a hub 1710a. The fins 1720a may function as a centrifugal blower to generate a higher velocity flow of air around the motor 100 as the wheel rotates, thus increasing convective heat transfer. FIG. 17B shows another exemplary cooling hub 1700b with spiral fins 1720b disposed on the periphery of a hub 1710b to produce a similar flow of air.

Figure 17C:
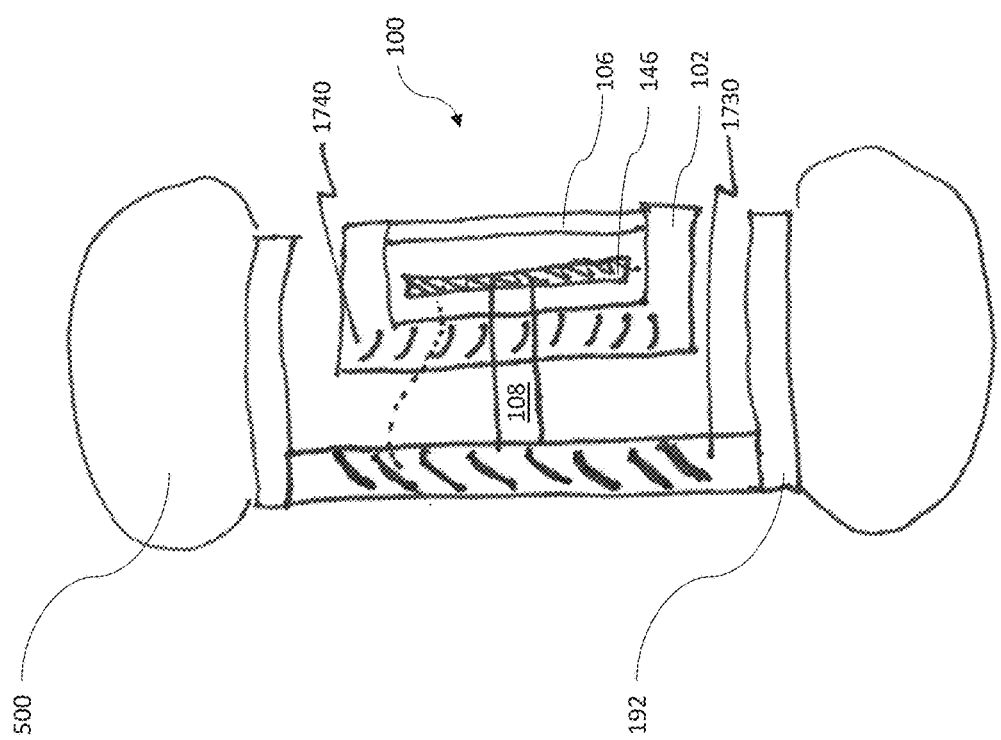
FIG. 17C shows a cross-sectional side view of another exemplary axial flux motor and wheel assembly with stator guide vanes and rotor blades to generate an air flow through the wheel assembly.

FIG. 17C shows different placements of cooling fins 1730 and 1740 with respect to the motor 100, wheel assembly, and other components. For example, the cooling fins can be within the flow path generated by side vents (or other aerodynamic elements) on the vehicle. In another example, the wheel hub 192 may include rotor blades 1730 that draw in air through the wheel assembly and across the motor 100. A cooling hub may be designed and placed to receive air from the rotor blades 1730. In another example, stator guide vanes 1740 may be integrated onto the exterior of the outboard housing 102 (or the inboard housing 106) for the same purpose.

Actuating Multiple Degrees of Freedom (DOF) with an Axial Flux Motor

The coil stator assemblies 126 and 128 in the axial flux motor 100 may each generate torque to rotate the magnetic rotor assembly 146. Additionally, the reaction torques produced by the coil stator assemblies 126 and 128 may be used to actuate another mechanism in the vehicle (e.g., a suspension). For example, FIG. 9 shows the coil stator assemblies 126 and 128 coupled to torque links 172 and 174, respectively, to transfer torque generated by each coil stator assembly to the body of the vehicle supporting the motor 100. As shown, the torque link 172 may be connected to an attachment point 176 on the ring 104 via a pivot joint such that the torque link 172 may swivel about the point 176. The attachment point 176 may be located along one side of the motor 100. The torque link 174 may be positioned at an opposing side from the torque link 172. As shown, the torque link 174 may be connected to an attachment point 178 on a torque link attachment bracket 177 via a pin joint. The torque link attachment bracket 177 may be coupled to the inboard housing 106. The torque link attachment bracket 177 may be shaped to position the attachment point 178 at a radial distance (i.e., the distance from the rotation axis 114) substantially similar to the radial distance of the attachment point 176. FIG. 9 shows the attachment points 176 and 178 are approximately located at angles of 90° and 270°, respectively, along the inboard side of the motor 100 where 0° corresponds to the top of the motor 100. The other ends of the torque links 172 and 174 may be directly attached to the vehicle or indirectly attached to the vehicle via rigid connecting brackets 173 and 175 as shown in FIG. 14.

Figure 10:
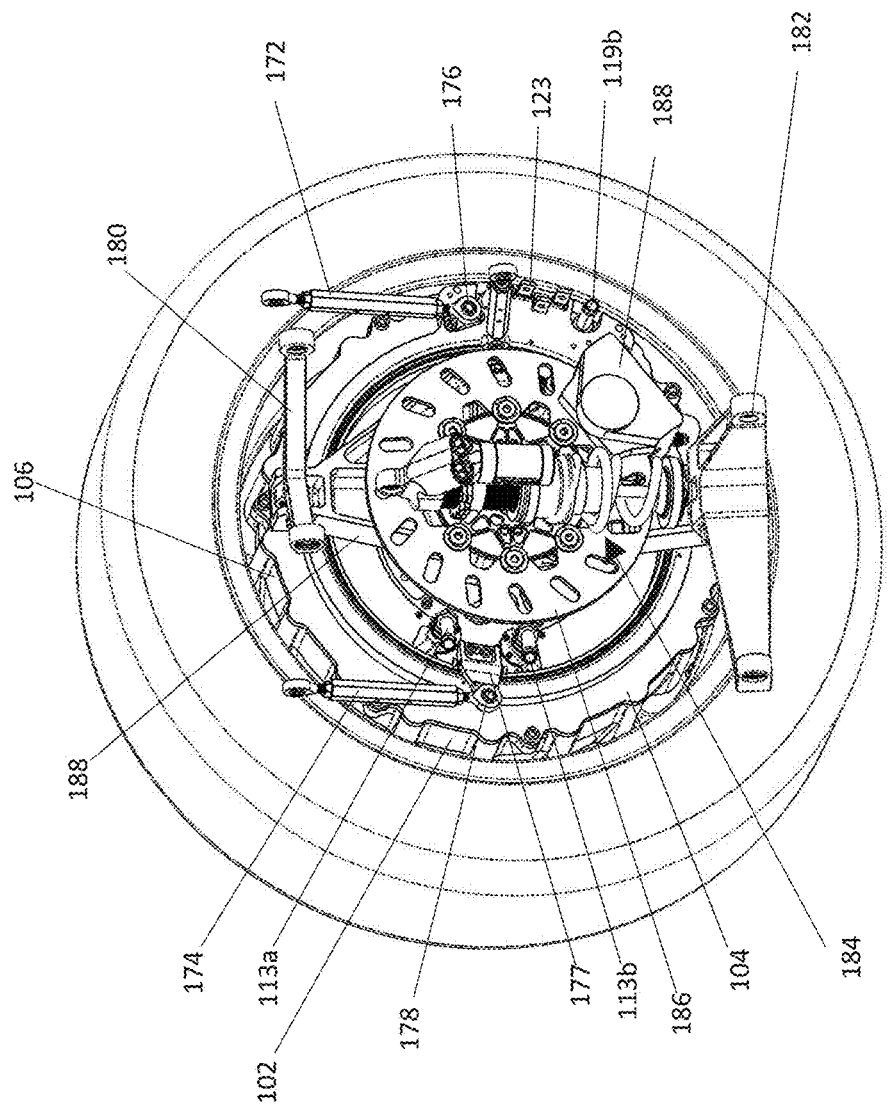
FIG. 10 shows a front perspective view of the axial flux motor of FIG. 1 integrated into a suspension and wheel assembly of a vehicle.
Figure 11:
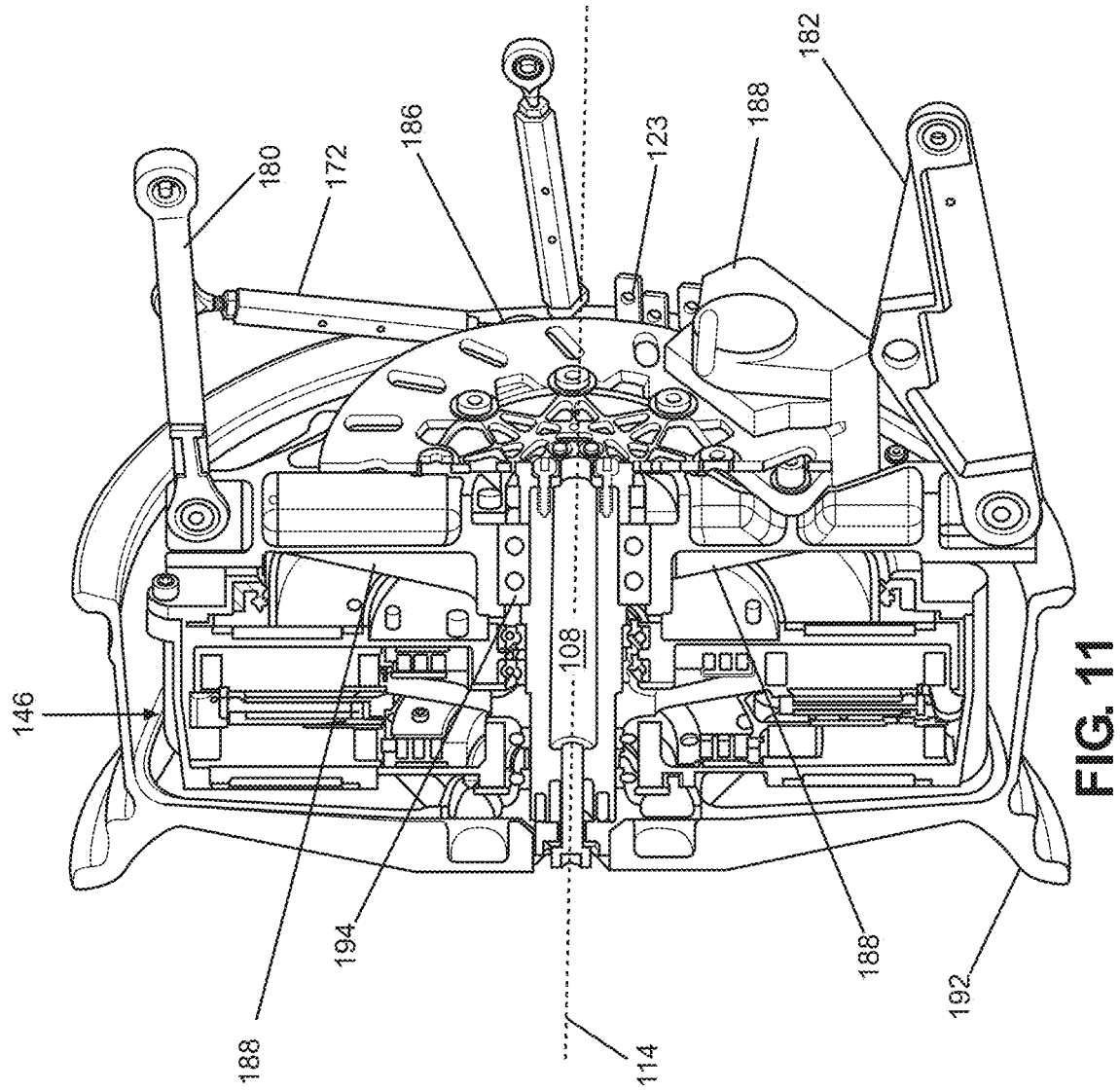
FIG. 11 shows a cross-sectional front perspective view of the wheel assembly of FIG. 10.
Figure 14:
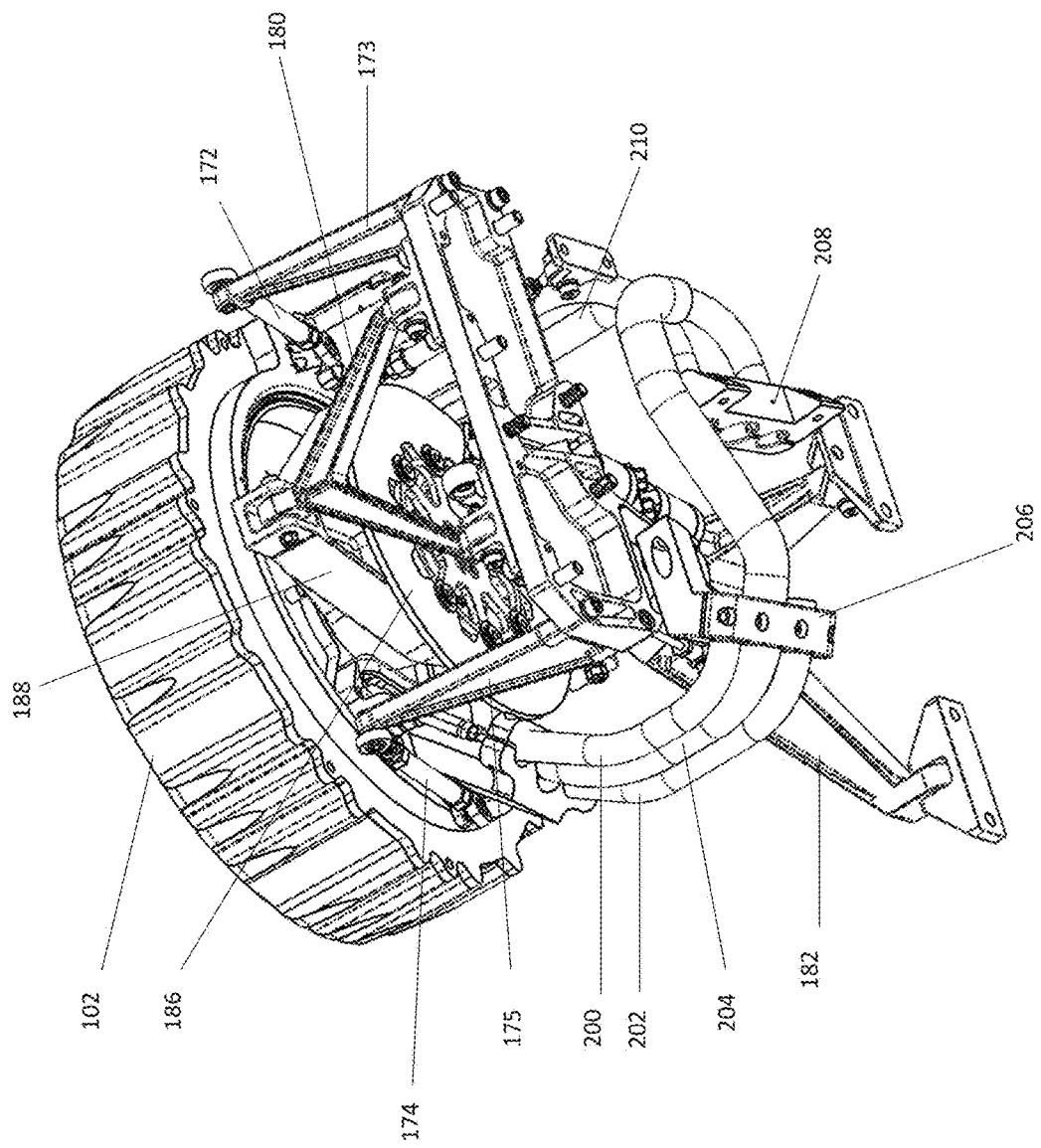
FIG. 14 shows a front perspective view of the wheel assembly of FIG. 10 with the coolant supply tubes, the electrical cables, and the strain reliefs.

FIGS. 10, 11, and 14 show a vertically oriented support structure 188 with wheel bearings 194 that hold the spindle 108. A tire rim 192 may be bolted onto the outboard end of the spindle 108 and a brake disk 186 may be bolted onto the inboard end of the spindle 108. The wheel bearings 194 permit the tire rim 192, the magnetic rotor assembly 146, which may be rigidly coupled to the spindle 108, and the brake disk 186 to rotate about the rotational axis 114 of the spindle 108. A brake pad assembly 190 may be mounted on the support structure 188 straddling the brake disk 186.

The support structure 188 may be connected to the vehicle frame or body (not shown) via an A-frame suspension assembly that includes an upper A-arm 180 attached to the upper end of the support structure 188 and a lower A-arm 182 attached to the lower end of the support structure 188. The upper and lower A-arms 180 and 182 permit the vehicle body to move up and down relative to the wheel and the motor 100. A spring and damper assembly 184 may be connected between the lower A-arm 182 and a point that is rigidly connected to the vehicle frame or body to support the vehicle at a fixed position relative to the ground. The spring and damper assembly 184 may also permit the vehicle to move up and down in response to (1) bumps encountered along the surface of the road as the vehicle is moving and (2) the torques generated by the inboard and outboard coil stator assemblies 126 and 128 (as described in more detail below).

The actuation of different DOFs via the axial flux motor 100 may be best understood by separately examining two modes of operation. In the first mode, the coil stator assemblies 126 and 128 may generate only rotational motion of the wheel. In this mode, the coil stator assemblies 126 and 128 may each apply a torque to the magnetic rotor assembly 146. The torques may be oriented along the same rotational direction, thus causing the magnetic rotor assembly 146 to revolve about the rotation axis 114 along the same direction (e.g., a clockwise direction as indicated by the arrow in FIG. 9). A corresponding reaction torque is generated at each stator assembly causing the stator assemblies 126 and 128 to rotate in an opposite direction with respect to the rotor assembly 146 (e.g., a counterclockwise direction). In FIG. 9, the torque link 172 moves in an upward direction and the torque link 174 moves in a downward direction. If the drive signals used to control the coil stator assemblies 126 and 128 are configured such that the resultant reaction torques from the stator assemblies produce upward and downward forces with substantially equal magnitudes, the spindle 108 and the motor 100 remain at a fixed position relative to the vehicle while the magnetic rotor assembly 146 with the tire rim 192 rotate in a clockwise direction.

Figures 12A, 12B, 12C:
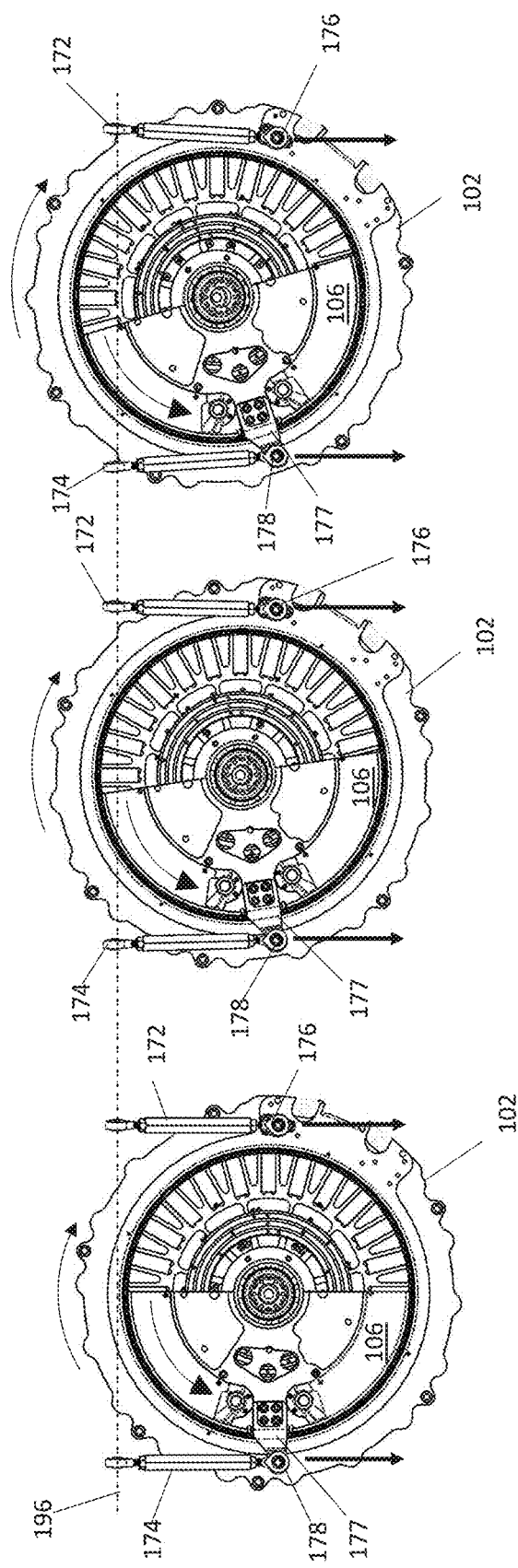
FIG. 12A shows the wheel assembly of FIG. 10 where the coil stator assemblies are at respective first rotational positions.
FIG. 12B shows the wheel assembly of FIG. 12A where the coil stators assemblies are rotated relative to one another to respective second rotational positions resulting in translational movement of the wheel assembly.
FIG. 12C shows the wheel assembly of FIG. 12B where the coil stator assemblies are rotated relative to one another to respective third rotational positions resulting in additional translational movement of the wheel assembly.

In the second mode, the coil stator assemblies 126 and 128 may generate only translational motion of the wheel relative to the vehicle. In this mode, the drive signals to the coil stator assemblies 126 and 128 are selected to produce counteracting torques on the magnetic stator assembly 146 that are substantially equal in magnitude. For example, the inboard coil stator assembly 128 may apply a torque to rotate the magnetic rotor assembly 146 along a clockwise direction while the outboard coil stator assembly 126 may apply a torque rotate the magnetic rotor assembly 146 along a counterclockwise direction. The applied torques thus cancel and the magnetic rotor assembly 146 does not rotate. However, the reaction torques generated by the inboard coil stator assembly 128 and the outboard coil stator assembly 126 may cause the torque links 174 and 172 to rotate in a counter-clockwise and clockwise direction, respectively, producing a net downwards force (with respect to the motor 100). Since the location of the attachment points 176 and 178 are fixed relative to the vehicle frame or body, the spindle 108 and attached tire rim 192 will move upwards relative the vehicle. FIGS. 12A-12C show a sequence of views depicting the motor rising as the coil stator assemblies 126 and 128 rotate relative to a reference line 196 representing the level of the vehicle to which the motor 100 is attached.

In practice, the motor 100 may produce a combination of both the first mode and the second. In other words, the motor 100 may be used to both rotate the wheel to propel the vehicle and to translate the wheel relative to the vehicle to provide an active suspension. As evidenced by the above description, it should also be appreciated that the term "stator" (e.g., as in coil stator assembly) and in the claims is not meant to imply that the element is a fixed, non-rotating part. Rather, the above-described coil stator assembly may rotate and/or otherwise move relative to the spindle 108 and the vehicle.

Vehicle Suspension

Figures 18A, 18B, 18C:
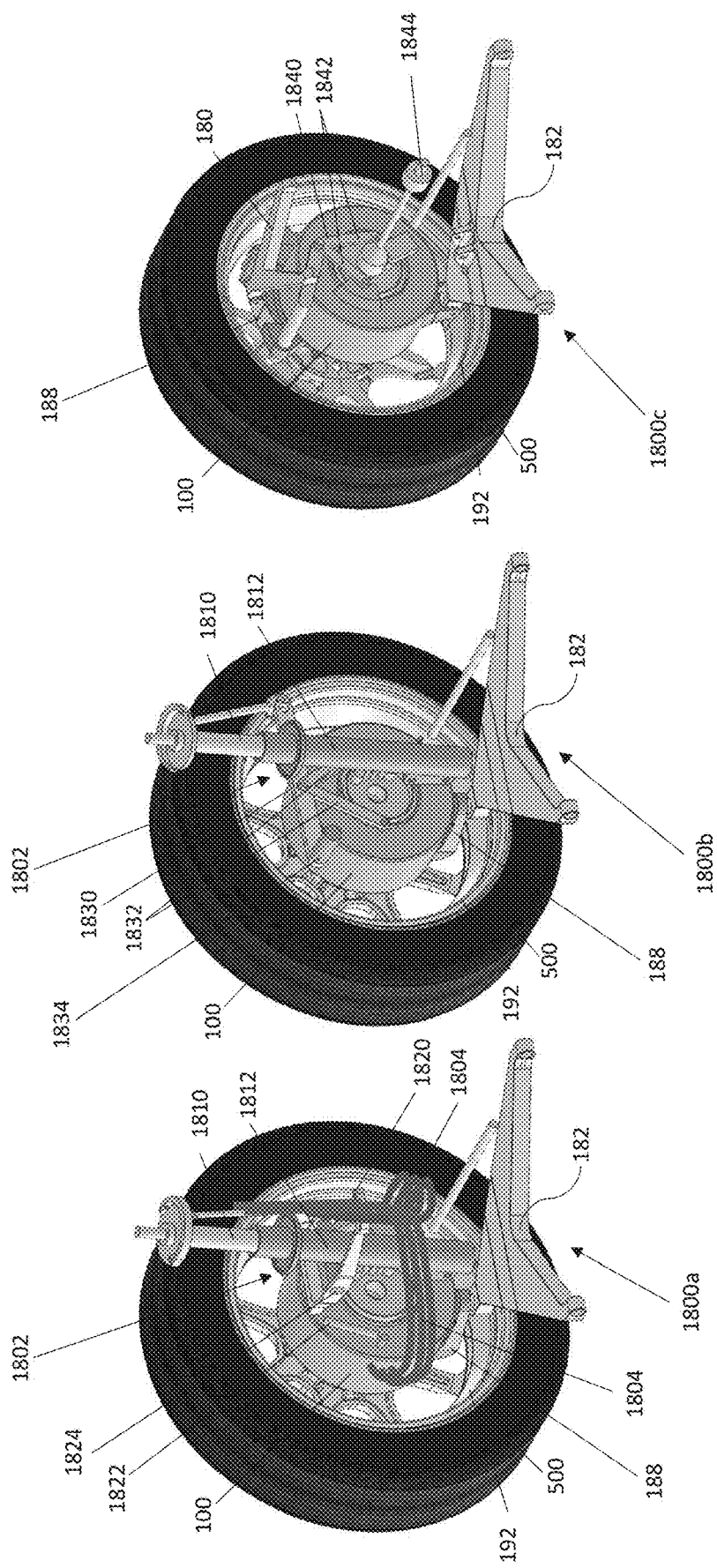
FIG. 18A shows an exemplary wheel assembly and axial flux motor in an outboard configuration with a MacPherson strut and rocker and electrical connections running along the MacPherson strut to the axial flux motor.
FIG. 18B shows an exemplary wheel assembly and axial flux motor in an outboard configuration with a MacPherson strut and Panhard bar with electrical connections similar to those in FIG. 18A.
FIG. 18C shows an exemplary wheel assembly and axial flux motor in an outboard configuration with an A-arm suspension and a driveshaft and electrical connections similar to those in FIG. 18A.

FIGS. 10, 11, and 14 show one exemplary suspension that may be coupled to the motor 100. Other types of suspensions may also be actuated via a force output from the motor 100. For example, FIG. 18A shows an exemplary suspension 1800*a* with a MacPherson strut 1802 and a rocker arm 1820. As shown, the suspension 1800*a* may include a lower A-arm support 182 to couple the support structure 188 (e.g., a suspension upright) to the vehicle chassis (not shown). The MacPherson strut 1802 may include a strut tube 1812 that is rigidly coupled to the support structure 188 such that the strut tube 1812 and the support structure 188 move together as a single unit. The strut tube 1812 supports a strut mount 1810 that is affixed to the vehicle chassis and is slidably adjustable relative to the strut tube 1812 to provide a translational DOF.

A rocker arm 1820 may couple the motor 100 to the MacPherson strut 1802 for actuation. Specifically, the rocker arm 1820 may be rotatable about a pivot point 1824 defined by the strut tube 1812 where one end of the rocker arm 1820 is coupled to the strut mount 1810 and the other end is coupled to the outboard housing 102 and the inboard housing 106 via respective torque links 1822 and corresponding pin joints. If the outboard housing 102 and the inboard housing 106 rotate in opposite directions with respect to one another, the resultant motion of the torque links 1822 causes the rocker arm 1820 to rotate, thus causing the strut mount 1810 to translate relative to the strut tube 1812.

FIG. 18B shows another suspension 1800*b* that uses a MacPherson strut 1802 in combination with a Panhard bar 1830. The Panhard bar 1830 may be rotatable about a pivot point 1834, which is aligned parallel to the rotation axis 114 and located at one end of the Panhard bar 1830. The pivot point 1834 may be affixed to the strut tube 1812 and/or the support structure 188 via another support member (not shown). The opposing end of the Panhard bar 1830 may be coupled to the strut mount 1810. The center of the Panhard bar 1830 may be coupled to the outboard housing 102 and the inboard housing 106 of the motor 100 via respective torque links 1832. Similar to the suspension 1800*a*, if the outboard housing 102 and the inboard housing 106 rotate in opposite directions with respect to one another, the resultant motion of the torque links 1832 causes the Panhard bar 1830 to rotate about the pivot point 1834, thus causing the strut mount 1810 to translate relative to the strut tube 1812.

FIG. 18C shows another suspension 1800*c* that includes a support structure 188 to support the motor 100 coupled to the vehicle chassis via a lower A-arm 182 and an upper A-arm 180. In this case, the suspension 1800*c* includes a driveshaft 1844 that outputs the differential torque between the coil stator assemblies 126 and 128. The driveshaft 1844 may be coupled to the vehicle chassis via another mechanism (not shown) to provide actuation of the suspension along a DOF defined by the constraints imposed by the A-arms 180 and 182. The support structure 188 may constrain the range of rotation of the coil stator assemblies 126 and 128. As shown, a linkage mechanism 1840 may couple the support structure 188 to the outboard housing 102 and the inboard housing 106 of the motor 100. The linkage mechanism 1840 includes respective torque links 1842 that are rotatably coupled to the outboard housing 102 and the inboard housing 106. Additionally, the linkage mechanism 1840 is rotatably coupled to the support structure 188. As the outboard housing 102 and the inboard housing 106 move in opposition relative to one another, the torque links 1842 may limit how far the outboard housing 102 and the inboard housing 106 move relative to one another.

Figure 19B:
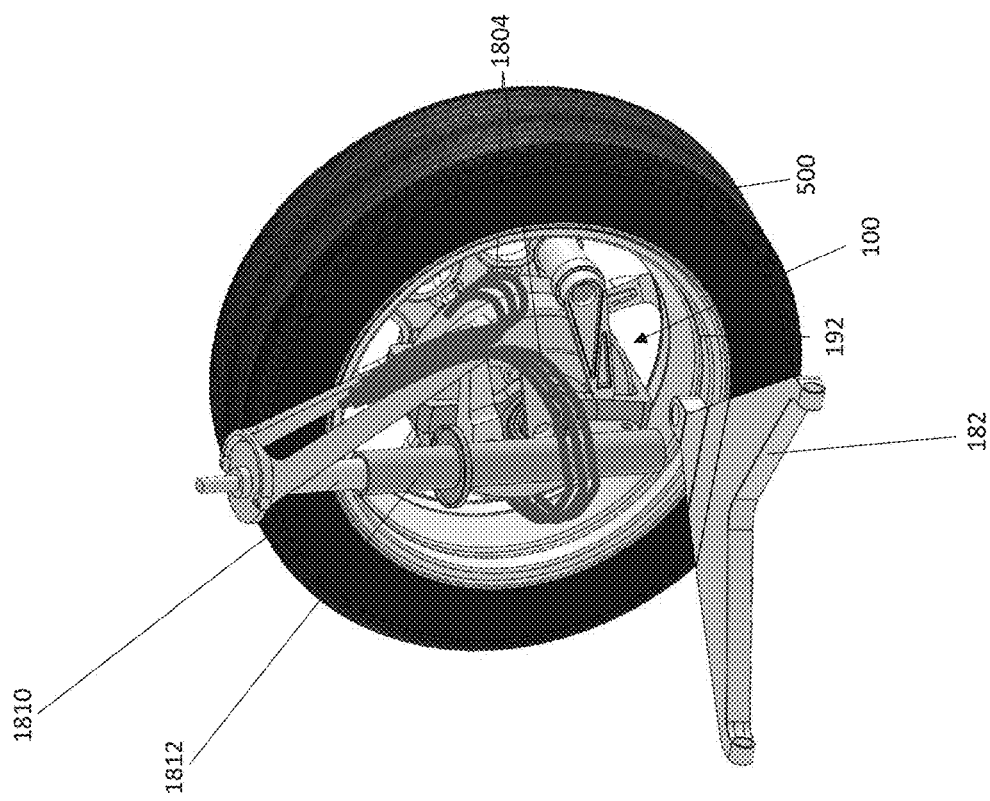
FIG. 19B shows an exemplary axial flux motor with electrical connections in an outboard configuration.
Figure 19A:
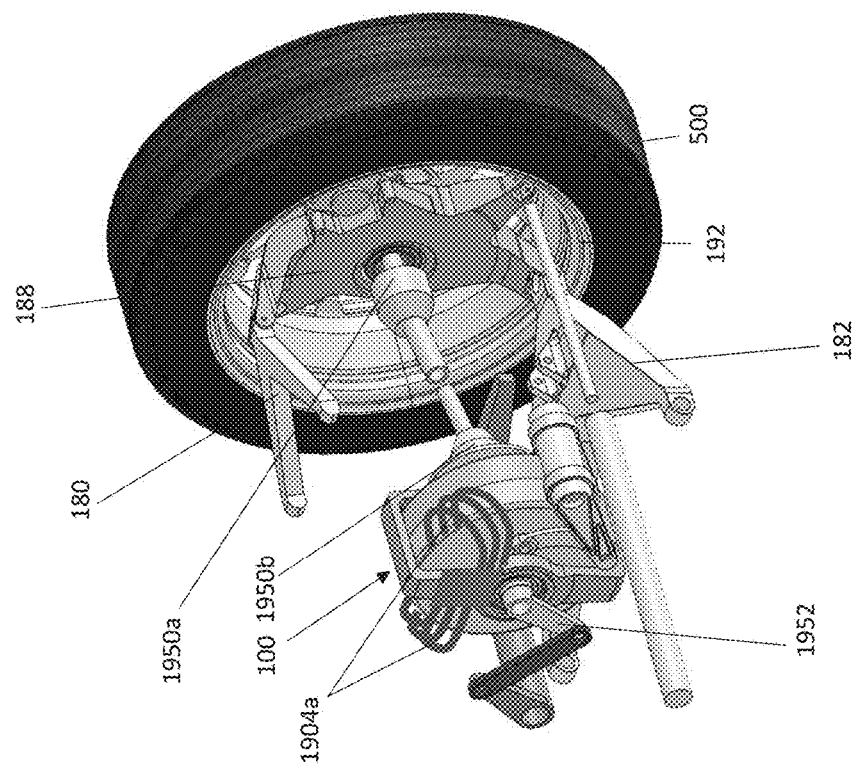
FIG. 19A shows an exemplary axial flux motor with electrical connections in an inboard configuration.

The type of suspension, or more generally the type of mechanism, actuated by the motor 100 may also depend on whether the motor 100 is mounted inboard or outboard with respect to the wheel hub 192 and the wheel 500. FIGS. 19A and 19B show the motor 100 mounted inboard and outboard, respectively. For the case of the inboard mounted motor 100 in FIG. 19A, the motor 100 and the active suspension mechanism 1852 are mounted on the chassis-side of the suspension such that these components are part of the vehicle's sprung mass. A pair of universal joints 1950*a* and 1950*b* may be used to transfer torque outputs from the motor 100 to the wheel 500 for traction. As shown, the suspension in FIG. 19A includes a support structure 188, a lower A-arm 182 and an upper A-arm 180. The active suspension mechanism 1852 may be coupled to the support structure 188 using a separate mechanism (not shown). On the other hand, FIG. 19B shows the motor 100 mounted outboard with the wheel 500. This configuration is similar to the suspensions 1800*a*-1800*c* described above. In both configurations, the wheel hub 192 is mounted on an outboard end of the spindle 108. For FIG. 19A, the spindle 108 includes the universal joints 1950*a* and 1950*b*.

Figure 20:
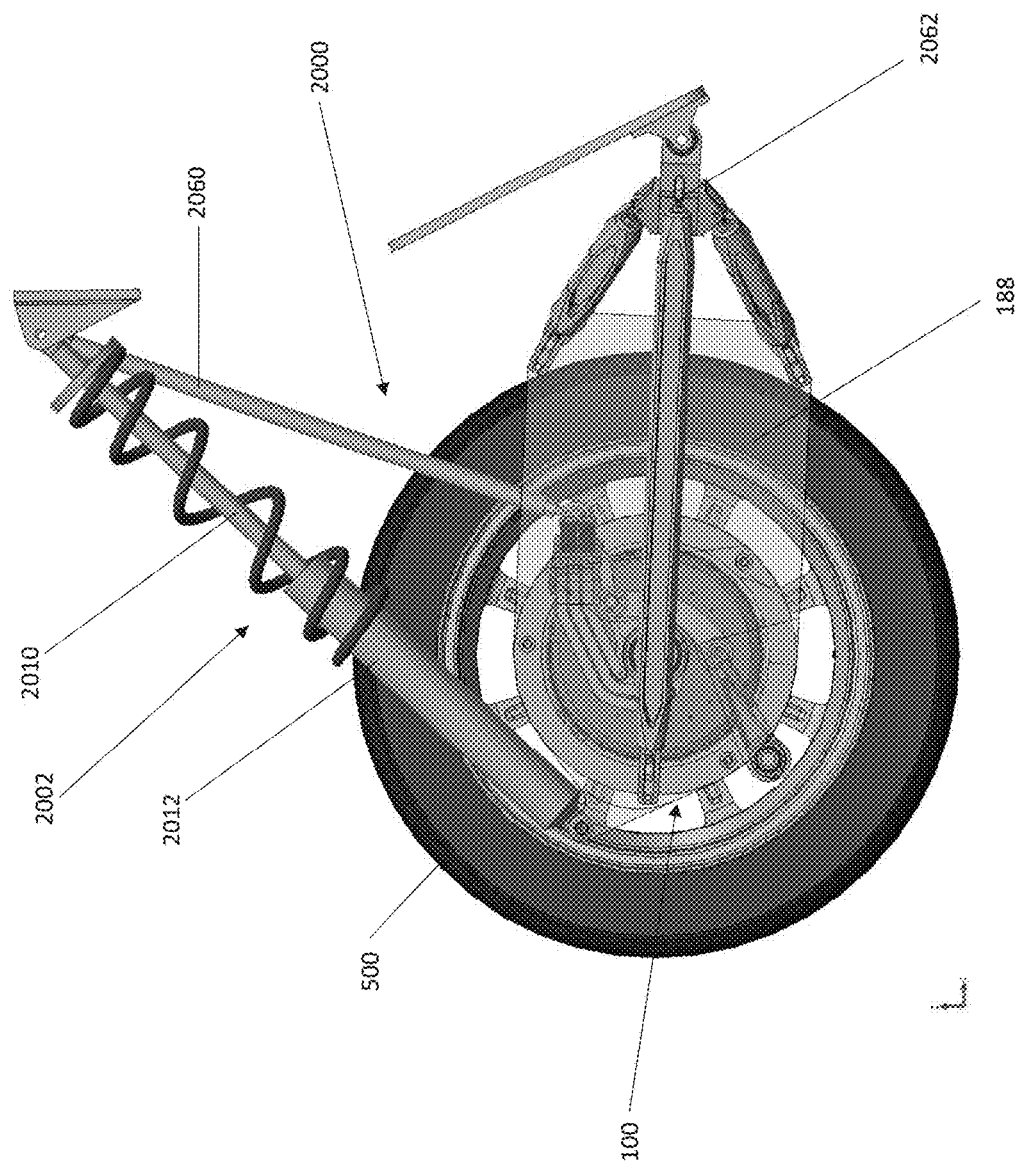
FIG. 20 shows a front view of an exemplary wheel assembly and axial flux motor mounted to a swing arm suspension.

FIG. 20 shows a swing arm suspension 2000 for motorcycles, bicycles, or scooters. As shown, the motor 100 may be mounted to a support structure 188, which may be a fork structure that mechanically supports both sides of the wheel 500. The support structure 188, in turn, may be mounted to the vehicle's chassis via an arm 2062 (e.g., a leading arm, a trailing arm) that is rotatably coupled to the support structure 188 and the vehicle's chassis. The arm 2062 may be used to constrain the motion of the wheel 500 to a curved path (e.g., a circular arc). The support structure 188 may also be coupled to the vehicle via a MacPherson strut 2002. In particular, the strut tube 2012 may be rotatably coupled to the support structure 188. The motor 100 may be coupled to the strut mount 2010 via a rod 2060 that is rotatably coupled to both the vehicle and the motor 100. The rod 2060 may thus be actuated by the motor 100 such that the rod 2060 causes the strut mount 2010 to translate along the strut tube 2012. In some cases, the motor 100 may include a counter rotation mechanism that transfers the reaction torque exerted on the inboard housing 106 to the outboard housing 102 (or vice-versa). Thus, the rod 2060 may only have to be connected to one of the outboard housing 102 or the inboard housing 106.

Routing Cables Connected to an Axial Flux Motor

The relative motion of the coil stator assemblies 126 and 128 may cause cables and/or tubing (e.g., electrical cables, coolant tubing) connected to the motor 100 to move. This movement may twist, flex, or bend the cables and/or tubing in a way that eventually causes the cables and/or tubing to fail. Therefore, it is desirable to reduce the motion of the cables as the motor 100 causes the wheel to rotate and translate. This may be facilitated, in part, by placing all electrical and fluid connections on the same side of the motor 100 close to the attachment point between the motor 100 and the suspension. For example, motors 100 that use liquid cooling may have coolant flow passages on each coil stator assembly that are arranged such that the tubing is disposed on the inboard side of the motor 100 as described above.

Figure 8A:
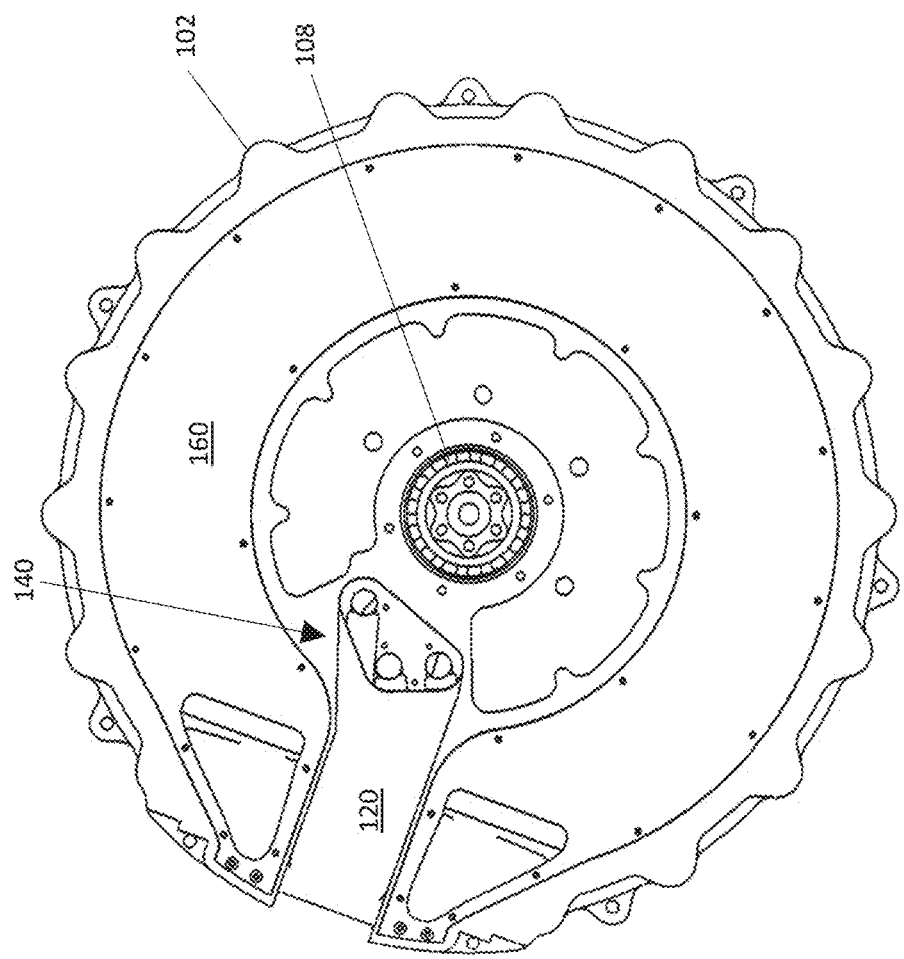
FIG. 8A shows a rear view of the axial flux motor of FIG. 1.

Electrical cables for the coil stator assemblies 126 and 128 may similarly be disposed on the inboard side of the motor 100. For instance, FIGS. 8A, 8B, and 9 show the outboard housing 102 includes a recessed area (a channel, trough, or conduit) 120 located between the coolant channels 118a and 118b. The recessed area 120 wraps around the rear side of the outboard housing 102 and extends up to the electrical terminals 140 on the side of the outboard housing 102. The recessed area 120 holds three conductors 122 (busbars) that connect to the electrical terminals 140 and extend forward within the recessed area 120 to the inboard side of the motor 100 where the conductors 122 connect to the motor's electrical drive control system (not shown). The conductors 122 may be in a tube or sheath (not shown) for additional protection. The three conductors 122 may supply three-phase electrical power (e.g., ABC, RYB, UVW) to the motor 100.

FIGS. 10 and 11 show a three-pronged electrical connector 123 at the end of the conductors 122 for electrical connection to the vehicle's drive signal system. As with the cooling system, electrical access to the coil assemblies 130 for both coil stator assemblies 126 and 128 may be made on the same side of the motor 100 (e.g., the inboard side) for ease of connectivity and cable routing.

Another approach to reduce undesirable motion of the cables is to place the cables near the attachment points 176 and 178 for the torque links 172 and 174, respectively. Since the attachment points 176 and 178 are connected to the vehicle by the torque links, the movement of the points 176 and 178 will be small compared to other locations on the motor 100 when the coil stator assemblies 126 and 128 rotate to produce lateral translation of the motor 100. This ensures the cables are subjected to small amounts of flexing and stress when connected to the motor 100.

The electrical wiring (and coolant tubing) may run along the torque link to reduce unwanted bending and twisting of the electrical wiring (and coolant tubing). In addition, the distance between the torque link attachment points 176, 178 and the electrical terminals may be selected to reduce unwanted bending and twisting. Technically, the distance should satisfy the creepage and clearance distances between conductors that are specified by the applicable safety standard (e.g., ISO, IEC). For low voltages (i.e., 48 V), this distance can be 0.1 mm to 1.5 mm. This distance may also be greater than or equal to the wire's bend radius, which depends on the wire diameter, composition, and coating.

For the motor 100 shown in FIG. 9, the port connectors 113a and 113b for the cooling system may be angled (e.g. 45°) such that the tubing used to flow coolant are coupled closer to the attachment point 178 (e.g., the radial location of the tubing is adjusted to be similar to the radial distance of the attachment point 178). More generally, the electrical connectors, the attachment points for the torque links, and the inlet and outlets for coolant on each side of the motor 100 should preferably lie within a circular sector subtending an angle less than about 40°. To reiterate, it is desirable to keep this angle small so that the various connection points for the cables are close to the respective attachment points, thus reducing the vertical movement that the cables experience during translational movement of the motor 100.

In yet another approach, the structural components coupling the motor 100 to the vehicle may also restrict the range of motion of the coil stator assemblies 126 and 128. As described above, both coil stator assemblies 126 and 128 may be mounted on the motor 100 such that each stator assembly is free to rotate about the rotational axis 114 independent of each other and independent of the magnetic rotor assembly 146. The torque links 172 and 174, the A-frame suspension, and the support structure 188 may be configured to limit the range of movement of the coil stator assemblies 126 and 128. For example, the coil stator assemblies 126 and 128 may be constrained to move in opposite directions relative to the rotation axis 114. Said in another way, if the inboard coil stator assembly 128 rotates in a clockwise direction by 10° about the rotation axis 114, the outboard coil stator assembly 126 should rotate in a counterclockwise direction by 10° about the rotation axis 114.

FIGS. 10 and 14 show one exemplary configuration of an axial flux motor 100 coupled to a suspension with tubing for coolant and electrical wiring to control the coil stator assemblies 126 and 128. As shown, a coolant supply tube 200 may be connected to the coolant inlet port connector 113a and a coolant return tube (not shown) may be connected to the coolant outlet port connector 113b for the outboard coil stator assembly 126. An electrical cable 210 may connect to the electrical terminal 123 to supply a drive signal to the outboard coil assemblies 130 in the outboard coil stator assembly 126. A similar arrangement may be used to connect cables to the inboard coil stator assembly 128. A coolant supply tube 202 may be connected to the coolant inlet port connector 119a, a coolant return tube (not shown) may be connected to the coolant outlet port connector 119b, and an electrical cable 204 may connect to the three terminals 110 (see FIG. 9) to supply drive signals to the inboard coil assemblies 130 in the inboard coil stator assembly 128.

As described above, the rotational motion of the inboard and outboard housings 106 and 102 may cause the attachment points 176 and 178 to undergo translational motion. This rotational movement may impart a twisting motion to the electrical cables 210 and 204 (see FIG. 14) coupled to the terminals 123 (FIG. 10) and 110 (FIG. 9), respectively. It is undesirable for the electrical cables to undergo such strain especially since the electrical cables are typically bundles of twisted wires that will resist the twisting motion. If the cables are twisted too much or too frequently, they will wear more and may fail. In order to reduce unwanted twisting motion, the electrical cables may be routed in a manner that prevents twisting motion as the inboard and outboard housings 106 and 102 rotate.

For example, each cable 204 and 210 may be mechanically supported by the motor 100 such that the cable is oriented with an approximately 90° bend relative to the electric terminals 110 and 123 (e.g., the terminals 110 and 123 may be oriented parallel to the rotation axis 114 and the cables 204 and 210 may be aligned along a radial axis orthogonal to the rotation axis 114). To support this cable orientation, a strain relief bracket 206 may be mounted to the vehicle frame to hold the cable 204 to ensure the cable 204 follows a path that is approximately 90° relative to the direction the electrical cable 204 leaves its connection point at or near the terminal 110. In FIG. 14, the terminal 110 is oriented at an angle of about +45° (with respect to the inboard side of the motor 100) similar to the coolant tubing 200 and 202, hence, the strain relief bracket 206 holds the electrical cable 204 at an angle of approximately −45° corresponding to a 90° bend. Similarly, another strain relief bracket 208 may be used to support the electrical cable 210. In FIG. 14, the terminal 123 is oriented at an angle of about 90° with respect to the inboard side of the motor 100. The strain relief bracket 208 thus holds the electrical cable 210 at an angle of approximately 0° (i.e., approximately parallel to the inboard side of the motor 100) corresponding to a 90° bend. In this manner, rotational movement of the housings 102 and 106 will cause the cables 204 and 210 to bend at the strain relief brackets 206 and 208, respectively, rather twist.

Additionally, the manner in which the cables are routed to other vehicle subsystems may also depend on whether the motor 100 is mounted inboard or outboard with respect the wheel 500. For example, if the motor 100 is mounted outboard with the wheel 500 (thus contributing to the unsprung mass of the vehicle), the effects of the vehicle chassis moving relative to the motor 100 on the motion of cables should also be considered. For example, FIG. 18A shows cables 1804 (electrical cables, coolant tubing) may be routed from the motor 100 along a path that is initially horizontal with the ground plane of the vehicle before being bent nearly 90° (e.g., by a strain relief feature) to translate along the MacPherson strut 1802. This path may reduce the unwanted twisting motion of the cables described above.

FIG. 19B shows another exemplary set of cables 1804 that are again routed along the linkage mechanism connected to the strut mount 1810. In contrast, if the motor 100 is mounted inboard with the chassis of the vehicle, the manner by which the cables are routed may be more flexible since the motor 100 moves with other vehicle subsystems mounted on the chassis. For example, FIG. 19A shows the cables 1904 may be routed from the motor 100 along a path defined by the support structure on the chassis.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An axial flux motor comprising:
a spindle;
a first housing coaxial with and rotatable about the spindle;
a second housing coaxial with and rotatable about the spindle, the first housing and the second housing forming a cavity, the second housing being rotatable with respect to the first housing;
a linkage mechanism, rotatably coupled to the first housing and the second housing, to constrain movement of the first housing with respect to the second housing, wherein the linkage mechanism is not directly coupled to a vehicle chassis and allows movement of a rotational axis of the axial flux motor with respect to the vehicle chassis;
a seal, between the first housing and the second housing, to prevent debris and/or liquid from entering the cavity;
a magnetic rotor in the cavity and rigidly connected to the spindle;
a first stator assembly, in the cavity and coaxial with the spindle, to apply a first torque to the magnetic rotor; and
a second stator assembly, in the cavity and coaxial with the spindle, to apply a second torque to the magnetic rotor, wherein the seal is flexible and waterproof.

2. The axial flux motor of claim 1, wherein the first stator assembly is rigidly connected to the first housing and the second stator assembly is rigidly connected to the second housing.

3. The axial flux motor of claim 1, wherein the seal is between opposing surfaces of the first housing and the second housing.

4. The axial flux motor of claim 1, wherein the seal is configured to allow up to 1 millimeter of motion between the first housing and the second housing.

5. The axial flux motor of claim 1, further comprising:
a wheel hub at an outboard end of the spindle to receive a wheel.

6. The axial flux motor of claim 1, further comprising:
an electrical conduit, extending along at least a portion of an exterior of the first housing, to protect an electrical wire connected to the first stator assembly.

7. The axial flux motor of claim 6, wherein the electrical wire is routed to avoid twisting when the first housing rotates about the spindle.

8. The axial flux motor of claim 6, wherein:
the linkage mechanism comprises:
a torque link attached to the first housing; and
the axial flux motor further comprises:
an electrical terminal extending from the first housing and connected to the electrical wire,
wherein the torque link allows the spindle to move with respect to the vehicle chassis without over-tensioning the electrical wire.

9. The axial flux motor of claim 1, further comprising:
a cooling apparatus, thermally coupled to the first housing and the second housing, to dissipate heat generated by the first coil stator assembly and the second coil stator assembly.

10. The axial flux motor of claim 9, wherein the cooling apparatus comprises:
at least one coolant flow passage, disposed proximate to at least one of the first coil stator assembly or the second coil stator assembly, to carry a flow of coolant, the coolant dissipating heat generated by the at least one of the first coil stator assembly or the second coil stator assembly.

11. The axial flux motor of claim 10, wherein the at least one coolant flow passage comprises:
a first coolant flow passage formed on the first housing; and
a second coolant flow passage formed on the second housing.

12. The axial flux motor of claim 11, wherein the cooling apparatus further comprises:
a first pair of port connectors, fluidically coupled to the first coolant flow passage, to carry the coolant into and out of the first coolant flow passage; and
a second pair of port connectors, fluidically coupled to the second coolant flow passage, to carry the coolant into and out of the second coolant flow passage,
wherein the first and second pairs of port connectors are on a same side of the axial flux motor.

13. The axial flux motor of claim 10, wherein the cooling apparatus further comprises:
one or more fins to convectively dissipate heat generated by the at least one of the first coil stator assembly or the second coil stator assembly.

14. An axial flux motor comprising:
a spindle;
a first housing coaxial with and rotatable about the spindle via a first set of bearings disposed between the first housing and the spindle;
a second housing coaxial with and rotatable about the spindle via a second set of bearings disposed between the second housing and the spindle, the first housing and the second housing forming a cavity, the second housing being rotatable with respect to the first housing;
a linkage mechanism rotatably coupled to the first housing and the second housing to constrain movement of the first housing with respect to the second housing, wherein the linkage mechanism is not directly coupled to a chassis of a vehicle and allows movement of a rotational axis of the axial flux motor with respect to the vehicle chassis;
a seal, disposed between the first housing and the second housing, to prevent debris and/or liquid from entering the cavity, the seal being flexible and waterproof;
a magnetic rotor in the cavity and rigidly connected to the spindle;

a first coil stator assembly, in the cavity and rigidly connected to the first housing, to apply a first torque to the magnetic rotor;

a second coil stator assembly, in the cavity and rigidly connected to the second housing, to apply a second torque to the magnetic rotor;

a wheel hub mounted to an outboard end of the spindle;

a wheel, mounted to the wheel hub, to propel a vehicle;

a brake assembly, disposed outside the cavity and coupled to the spindle, to reduce a rotational speed of the wheel;

a suspension to mechanically connect the wheel hub to the chassis, the suspension being coupled to the first coil stator assembly via the first housing and the second coil stator assembly via the second housing such that when the first torque and the second torque are different in magnitude and/or direction, the first and second coil stator assemblies actuate the suspension thereby causing the wheel hub to translate relative to the chassis;

a cooling apparatus, thermally coupled to the first housing and/or the second housing, to dissipate heat generated by the first coil stator assembly and/or the second coil stator assembly; and an electrical cable, connected to the first housing, to supply electrical power to the first coil stator assembly, the electrical cable being routed along at least a portion of the suspension to avoid twisting when the first housing rotates about the spindle.

15. The axial flux motor of claim 14, wherein the cooling apparatus comprises:

at least one coolant flow passage, disposed proximate to at least one of the first coil stator assembly or the second coil stator assembly, to carry a flow of coolant, the coolant dissipating heat generated by the at least one of the first coil stator assembly or the second coil stator assembly.

16. The axial flux motor of claim 14, wherein the cooling apparatus further comprises:

one or more fins to convectively dissipate heat generated by the at least one of the first coil stator assembly or the second coil stator assembly.

17. A method of operating an axial flux motor comprising:

applying a first torque to a magnetic rotor using a first coil stator assembly rigidly connected to a first housing;

while applying the first torque, applying a second torque to the magnetic rotor using a second coil stator assembly rigidly connected to a second housing, the first housing and the second housing forming a cavity; and while applying the first and second torques to the magnetic rotor, maintaining a seal on the cavity to prevent debris and/or liquid from entering the cavity, wherein the first torque generates a corresponding first reaction torque that causes the first housing to rotate with respect to the second housing, wherein an electrical wire connected to the first housing is routed to avoid twisting in response to rotation of the first housing, wherein the first housing is coupled to the second housing via a linkage mechanism, wherein the linkage mechanism is not directly coupled to a chassis of a vehicle and allows movement of a rotational axis of the axial flux motor with respect to the vehicle chassis.

18. The method of claim 17, further comprising:

in response to applying the first and second torques to the magnetic rotor, at least one of rotating the magnetic rotor or translating a wheel hub coupled to the magnetic rotor.

19. The method of claim 17, further comprising:

while applying the first and second torques, dissipating heat generated by the first coil stator assembly and/or the second coil stator assembly using a cooling apparatus thermally coupled to the first housing and/or the second housing.

20. The method of claim 17, wherein dissipating the heat using the cooling apparatus comprises:

flowing coolant through at least one coolant flow passage disposed proximate to at least one of the first coil stator assembly or the second coil stator assembly.

\* \* \* \* \*